US010581481B1

(12) United States Patent
Moradi et al.

(10) Patent No.: US 10,581,481 B1
(45) Date of Patent: Mar. 3, 2020

(54) COMMUNICATION DEVICE, SPREAD-SPECTRUM RECEIVER, AND RELATED METHOD USING NORMALIZED MATCHED FILTER FOR IMPROVING SIGNAL-TO-NOISE RATIO IN HARSH ENVIRONMENTS

(71) Applicant: Battelle Energy Alliance, LLC, Idaho Falls, ID (US)

(72) Inventors: Hussein Moradi, Idaho Falls, ID (US); Jonathan D. Driggs, Salt Lake City, UT (US); Arslan J. Majid, Salt Lake City, UT (US); Behrouz Farhang, Salt Lake City, UT (US); Taylor M. Sibbett, Cottonwood Heights, UT (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 16/134,784

(22) Filed: Sep. 18, 2018

(51) Int. Cl.
*H04B 1/7093* (2011.01)
*H04L 27/26* (2006.01)
*H04B 1/71* (2011.01)

(52) U.S. Cl.
CPC .............. *H04B 1/7093* (2013.01); *H04B 1/71* (2013.01); *H04L 27/264* (2013.01); *H04B 2001/70935* (2013.01)

(58) Field of Classification Search
CPC ........ H04B 1/7093; H04B 1/71; H04L 27/264
See application file for complete search history.

(56) References Cited

U.S. PATENT DOCUMENTS

| 3,849,730 | A | 11/1974 | Ho |
| 5,204,901 | A | 4/1993 | Hershey et al. |
| 6,154,484 | A | 11/2000 | Lee et al. |
| 6,272,121 | B1 | 8/2001 | Smith et al. |
| 6,553,396 | B1 | 4/2003 | Fukuhara et al. |
| 6,651,408 | B1 | 11/2003 | McClure |
| 6,741,551 | B1 | 5/2004 | Cherubini |

(Continued)

FOREIGN PATENT DOCUMENTS

| CN | 1503463 A | 6/2004 |
| CN | 1559129 A | 12/2004 |

(Continued)

OTHER PUBLICATIONS

Ye et al., "On the Secrecy Capabilities of ITU Channels," Proc. IEEE Vehicular Technology Conf. (VTC '07-Fall), pp. 2030-2034, Oct. 2007.

(Continued)

*Primary Examiner* — Curtis B Odom
(74) *Attorney, Agent, or Firm* — TraskBritt

(57) ABSTRACT

A communication device, a method of operating a communication device, and a spread-spectrum receiver are disclosed. The method includes receiving an incoming RF signal, demodulating the incoming RF signal to generate a baseband signal, filtering the baseband signal with a normalized matched filter having filter characteristics matched to a pulse-shaping filter of the transmitter that generated the incoming RF signal, and extracting a received signal from a normalized output generated by the normalized matched filter. As a result, interferences and noise from harsh environments may be suppressed.

20 Claims, 15 Drawing Sheets

(56) References Cited

U.S. PATENT DOCUMENTS

| | | | |
|---|---|---|---|
| 7,123,934 | B1 | 10/2006 | Linebarger et al. |
| 7,180,963 | B2 | 2/2007 | Wang et al. |
| 7,394,844 | B1 | 7/2008 | Orr |
| 7,443,917 | B2 | 10/2008 | Vitenberg |
| 7,558,310 | B1 | 7/2009 | Von Der Embse |
| 7,609,611 | B1 | 10/2009 | Siohan et al. |
| 7,634,030 | B2 | 12/2009 | Kim et al. |
| 7,787,545 | B2 | 8/2010 | Orr et al. |
| 7,898,936 | B2 | 3/2011 | Al Adnani |
| 8,731,027 | B2 | 5/2014 | Moradi et al. |
| 9,215,587 | B2 | 12/2015 | Moradi et al. |
| 2002/0034160 | A1 | 3/2002 | Marchok et al. |
| 2002/0167991 | A1 | 11/2002 | Suzuki |
| 2003/0054851 | A1 | 3/2003 | Jo et al. |
| 2003/0058952 | A1 | 3/2003 | Webster et al. |
| 2003/0072382 | A1 | 4/2003 | Raleigh et al. |
| 2003/0165131 | A1 | 9/2003 | Liang et al. |
| 2004/0047430 | A1 | 3/2004 | McCarty |
| 2004/0101068 | A1 | 5/2004 | Wang et al. |
| 2004/0196780 | A1 | 10/2004 | Chin et al. |
| 2004/0213351 | A1 | 10/2004 | Shattil |
| 2004/0218695 | A1 | 11/2004 | Koga et al. |
| 2005/0047513 | A1 | 3/2005 | Vitenberg |
| 2005/0154925 | A1 | 7/2005 | Chitrapu et al. |
| 2005/0245268 | A1 | 11/2005 | Green et al. |
| 2007/0211786 | A1 | 9/2007 | Shattil |
| 2008/0130802 | A1 | 6/2008 | Conroy et al. |
| 2008/0226003 | A1 | 9/2008 | Chevalier et al. |
| 2008/0304551 | A1 | 12/2008 | Li et al. |
| 2008/0316912 | A1 | 12/2008 | Al Adnani |
| 2009/0316568 | A1 | 12/2009 | Harris et al. |
| 2010/0246375 | A1 | 9/2010 | Orlik et al. |
| 2011/0002232 | A1 | 1/2011 | Niewczas et al. |
| 2011/0188671 | A1 | 8/2011 | Anderson et al. |
| 2012/0002703 | A1 | 1/2012 | Yamashita et al. |
| 2012/0189036 | A1* | 7/2012 | Bellanger ............ H04L 27/2631 375/146 |
| 2013/0142218 | A1 | 6/2013 | Moradi et al. |
| 2014/0169431 | A1 | 6/2014 | Arambepola et al. |
| 2015/0049790 | A1* | 2/2015 | Moradi .................. H04B 1/707 375/146 |
| 2016/0295322 | A1* | 10/2016 | Orescanin ............... H04R 3/005 |

FOREIGN PATENT DOCUMENTS

| | | |
|---|---|---|
| CN | 1739274 A | 2/2006 |
| CN | 101867548 A | 10/2010 |

OTHER PUBLICATIONS

Ye et al., "Extracting secrecy from jointly Gaussian random variables," Proc. 2006 IEEE Int'l Symp. Information Theory (ISIT '06), pp. 2593-2597, Jul. 2006.

Wilson et al., "Channel identification: secret sharing using reciprocity in UWB channels," IEEE Trans. Information Forensics and Security, vol. 2, No. 3, pp. 364-375, Sep. 2007.

Wasden et al., "Design and Implementation of a Multicarrier Spread Spectrum Communication System," Military Communication Conference, IEEE, Oct. 29, 2012, pp. 1-7.

Tope et al., "Unconditionally secure communications over fading channels," Proc. Military Comm. Conf. (MILCOM '01), vol. 1, pp. 54-58, Oct. 2001.

Sayeed et al., "Secure wireless communications: secret keys through multipath," Proc. IEEE Int'l Conf. Acoustic, Speech and Signal Processing (ICASSP '08), pp. 3013-3016, Apr. 2008.

Patwari et al., "High rate uncorrelated bit extraction for shared secret key generation from channel measurements," IEEE Trans. Mobile Computing, vol. 9, No. 1, Jan. 2010, pp. 17-30.

Nigam et al., "Finite Duration Root Nyquist Pulses with Maximum In-Band Fractional Energy," IEEE Communications Letters, vol. 14, No. 9, Sep. 2010, pp. 797-799.

Merkle, R.C., "Secure communications over insecure channels," Commun. ACM, vol. 21, No. 4, 1978, pp. 294-299.

Maurer, U.M., "Secret Key Agreement by Public Discussion from Common Information," IEEE Trans. Inf. Theory, vol. 39, No. 3, May 1993, pp. 733-742.

Maurer et al., "Unconditionally secure key agreement and the intrinsic conditional information," IEEE Trans. Information Theory, vol. 45, No. 2, pp. 499-514, Mar. 1999.

Mathur et al., "Radio-telepathy: extracting a secret key from an unauthenticated wireless channel," Proc. ACM MobiCom, Sep. 2008.

Madiseh et al., "Secret key extraction in ultra wideband channels for unsynchronized radios," Proc. Sixth Ann. Conf. Comm. Networks and Services Research (CNSR '08), May 2008.

Li et al., "Securing wireless systems via lower layer enforcements," Proc. Fifth ACM Work-shop Wireless Security (WiSe '06), pp. 33-42, Sep. 2006.

Kondo et al., "Performance of multicarrier DS CDMA Systems," IEEE Transactions on Communications, vol. 44, pp. 238-246, 1996.

Kaleh, G.K., "Frequency-diversity spread-spectrum communication system to counter bandlimited gaussian interference," IEEE Transactions on Communications, vol. 44, No. 7, pp. 886-893, 1996.

Jana et al., "On fast and accurate detection of unauthorized access points using clock skews," Proc. ACM MobiCom, Sep. 2008.

Hershey et al., "Unconventional cryptographic keying variable management," IEEE Trans. Commun., vol. 43, No. 1, Jan. 1995, pp. 3-6.

Hassan et al., "Cryptographic key agreement for mobile radio," Elsevier Digital Signal Processing, vol. 6, 1996, pp. 207-212.

Hara et al., "Overview of multicarrier cdma," IEEE Communications Magazine, vol. 35, pp. 126-133, 1997.

Farhang-Boroujeny, B., "Square-root Nyquist (M) filter design for digital communication systems," IEEE Trans. on Signal Processing, vol. 56, No. 5, May 2008, pp. 2127-2132.

Farhang-Boroujeny, "OFDM Versus Filter Bank Multicarrier," IEEE Signal Processing Magazine, vol. 28, No. 3, May 1, 2011, pp. 92-112.

Dodis et al., "Fuzzy Extractors: How to Generate Strong Keys from Biometrics and Other Noisy Data. In Advances in Cryptology .cndot.U EUROCRYPT 2004," Jan. 20, 20008, pp. 1-46.

Cheun et al., "Antijamming performance of a multicarrier direct-sequence spread-spectrum system," IEEE Transactions on Communications, vol. 47, No. 12, pp. 1781-1784, Dec. 1999.

Azimi-Sadjadi et al., "Robust key generation from signal envelopes in wireless networks," Proc. 14th ACM Conf. Computer and Comm. Security (CCS '07), pp. 401-410, Nov. 2007.

Aono et al., "Wireless secret key generation exploiting reactance-domain scalar response of multipath fading channels," IEEE Trans. Antennas & Propagation, vol. 53, No. 11, pp. 3776-3784, Nov. 2005.

Ahlswede et al., "Common randomness in information theory and cryptography—Part I: secret sharing," IEEE Trans. Inf. Theory, vol. 39, No. 4, Jul. 1993, pp. 1121-1132.

Haddadin et al., "An underlay communication channel for 5G cognitive mesh networks: Packet design, implementation, analysis, and experimental results", IEEE International Conference on Communications (ICC) (2016) 9 pages.

Proakis, "Interference suppression in spread spectrum systems", IEEE 4th International Symposium on Spread Spectrum Techniques and Applications Proceedings, (1996), pp. 259-266.

Sibbett et al., "Novel maximum-based timing acquisition for spread spectrum communications", IEEE Globecom Conference (2016) 7 pages.

\* cited by examiner

COMMUNICATION DEVICE, SPREAD-SPECTRUM RECEIVER, AND RELATED METHOD USING NORMALIZED MATCHED FILTER FOR IMPROVING SIGNAL-TO-NOISE RATIO IN HARSH ENVIRONMENTS

STATEMENT REGARDING FEDERALLY SPONSORED RESEARCH OR DEVELOPMENT

This invention was made with government support under Contract No. DE-AC07-05-ID14517 awarded by the United States Department of Energy. The government has certain rights in the invention.

CROSS-REFERENCE TO RELATED APPLICATIONS

This application is related to U.S. Pat. No. 8,731,027, filed Dec. 5, 2011, issued May 20, 2014; U.S. Pat. No. 8,861,571, filed Dec. 5, 2011, issued Oct. 14, 2014; U.S. Pat. No. 9,215,587, filed Jan. 24, 2014, issued Dec. 15, 2015; U.S. Pat. No. 9,369,866, filed Sep. 26, 2014, issued Jun. 14, 2016; and U.S. Pat. No. 9,559,748, filed Mar. 4, 2016, and issued Jan. 31, 2017, the disclosure of each of which is hereby incorporated herein in its entirety by this reference.

FIELD

Embodiments of the present disclosure relate generally to systems, devices, and methods for wireless communication, in particular, for a spread-spectrum receiver using a normalized matched filter for improving a signal-to-noise ratio in harsh environments.

BACKGROUND

Filter bank multicarrier spread spectrum (FB-MC-SS) methods have previously been used for communication in harsh environments. In FB-MC-SS methods, each data symbol may be spread over N spectrally disjoint subcarrier frequency bands before transmission. At the receiver, a maximum ratio combiner (MRC) may combine the demodulated signals from different subcarrier bands to increase the signal-to-interference-plus-noise ratio (SINR) at the combiner output.

Assuming the receiver has already identified the presence of a data packet and has obtained the timing phase of the middle point of the received data symbols, methods have been adopted to measure the SINR at each subcarrier band and accordingly calculate the MRC coefficients. For example, method of performing these tasks has been described Haddidin et al., *An underlay communication channel for 5G cognitive mesh networks: Packet design, implementation, analysis, and experimental results*, IEEE International Conference on Communications (ICC) (2016). The receiver structure presented by Haddidin et al. can operate at some negative SINR, but may fail if part of the frequency band is corrupted by a high level of interference. Under this condition, the receiver may fail to detect the packet and/or identify the symbol timing phase, hence cannot operate successfully. In other words, in harsh environments, packet detection and symbol timing phase estimation are receiver bottle-necks that have not been addressed in prior solutions known to the inventors. Thus, the inventors have identified a need to address this limitation of FB-MC-SS communication methods.

BRIEF SUMMARY

In some embodiments, a method of operating a communication device is disclosed. The method comprises receiving, at a receiver, an incoming RF signal; demodulating, with a demodulator of the receiver, the incoming RF signal to generate a baseband signal; filtering the baseband signal with a normalized matched filter having filter characteristics matched to a pulse-shaping filter of the transmitter that generated the incoming RF signal; and extracting a received signal from a normalized output generated by the normalized matched filter.

In some embodiments, a spread-spectrum receiver for detecting and decoding a signal comprises a demodulator configured to generate a baseband signal responsive to demodulating an incoming RF signal, a normalized matched filter configured to filter the baseband signal with a normalized matched filter having filter characteristics matched to a pulse-shaping filter of the transmitter that generated the incoming RF signal, and a signal extractor configured to extract a received signal from a normalized output generated by the normalized matched filter.

In some embodiments, a communication device comprises a spread-spectrum receiver configured to suppress interference in individual subcarrier bands of a demodulated Filter-Bank Multi-Carrier Spread-Spectrum (FB-MC-SS) signal responsive to normalizing samples of the demodulated FB-MC-SS signal in the frequency domain to a power of unity.

DETAILED DESCRIPTION

Figure 1:
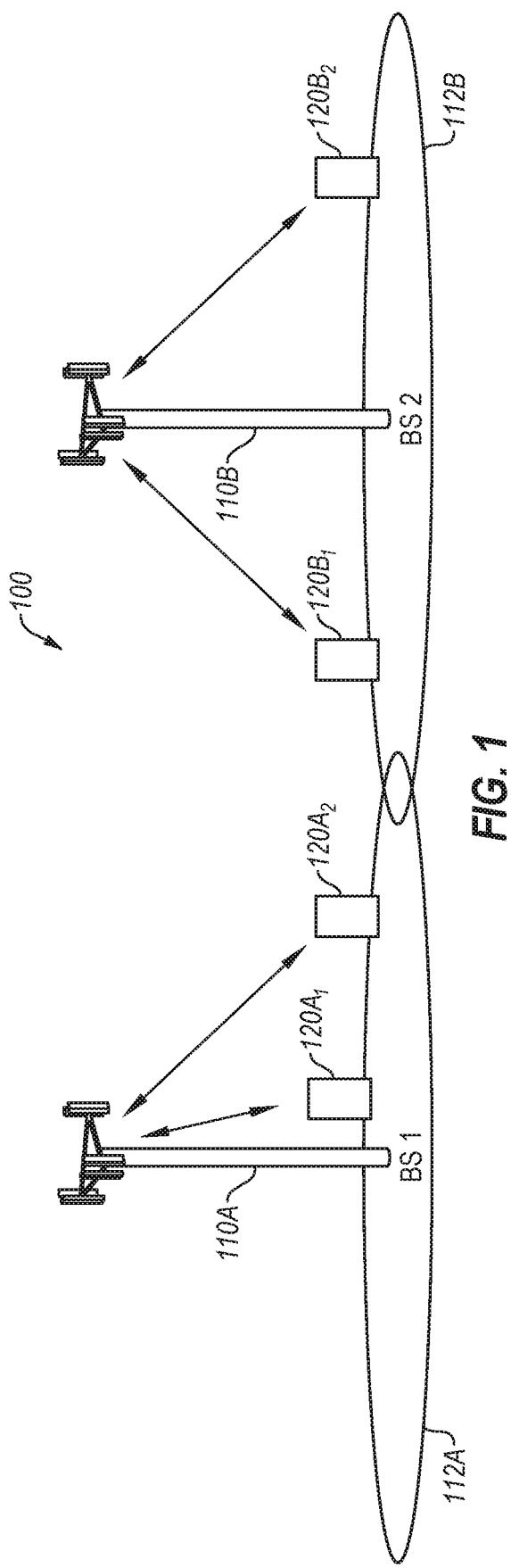
FIG. 1 is a schematic diagram of a wireless communication system according to an embodiment of the disclosure.

In the following description, reference is made to the accompanying drawings in which are shown, by way of illustration, specific embodiments in which the disclosure may be practiced. The embodiments are intended to describe aspects of the disclosure in sufficient detail to enable those skilled in the art to make, use, and otherwise practice the disclosure. Furthermore, specific implementations shown and described are only examples and should not be construed as the only way to implement the present disclosure unless specified otherwise herein. It will be readily apparent to one of ordinary skill in the art that the various embodiments of the present disclosure may be practiced by numerous other partitioning solutions. Other embodiments may be utilized and changes may be made to the disclosed embodiments without departing from the scope of the disclosure. The following detailed description is not to be taken in a limiting sense, and the scope of the present invention is defined only by the appended claims.

In the following description, elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths, and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, e.g., a combination of a DSP and a microprocessor, a plurality of microprocessors, one or more microprocessors in conjunction with a DSP core, or any other such configuration.

Also, it is noted that embodiments may be described in terms of a process that may be depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media include both computer storage media and communication media, including any medium that facilitates transfer of a computer program from one place to another.

It should be understood that any reference to an element herein using a designation such as "first," "second," and so forth, does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Embodiments of the disclosure include systems, devices, and methods in which interferences and noise from harsh environments may be suppressed using a normalized matched filter that is matched to a transmitter pulse-shaping filter. Throughout the disclosure, the matched filter of a conventional receiver may be referred to as a "standard matched filter" to be distinguished from what will be referred to as a "normalized matched filter" according to embodiments of the disclosure.

FIG. 1 is a schematic diagram of a wireless communication system 100 according to an embodiment of the disclosure. The wireless communication system 100 includes a first base station 110A having a first coverage area 112A that provides wireless communication services for UEs $120A_1$, $120A_2$. The wireless communication system 100 also includes a second base station 110B having a second coverage area 112B that provides wireless communication services for UEs 120B₁, 120B₂. In some embodiments, UEs 120A₁, 120A₂, UEs 120B₁, 120B₂ may operate in half-duplex mode, and the base stations 110A, 110B may operate in the full-duplex (FD) mode with self-interference cancellation capabilities. Each of the base stations 110A, 110B, and/or the UEs 120A₁, 120A₂, 120B₁, 120B₂ may include components such as one or more processors, transmitters, receivers, memory, etc. configured to enable each device to perform the functions described herein in more detail below.

Figure 2:
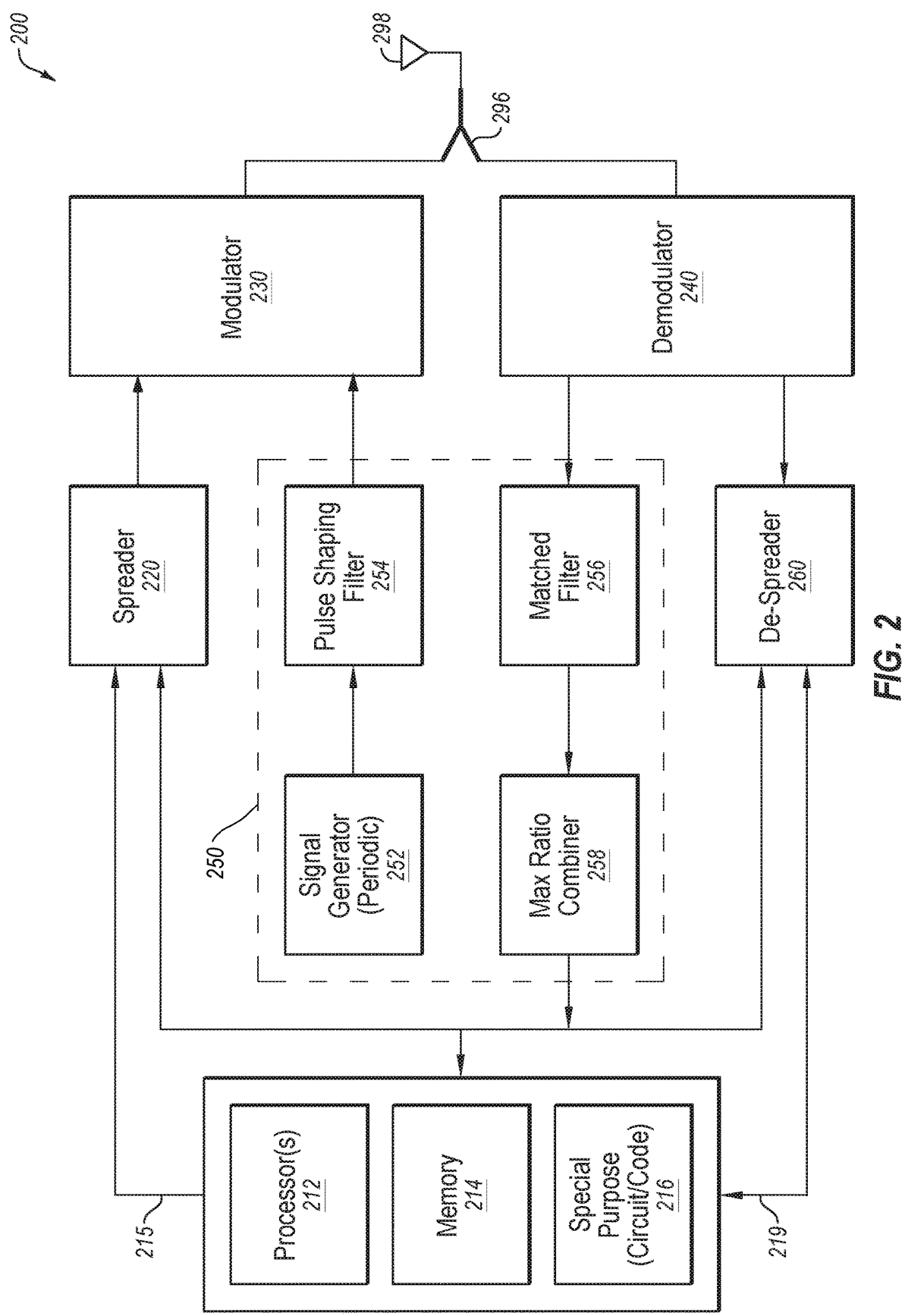
FIG. 2 is a block diagram of a communication device according to an embodiment of the disclosure.

FIG. 2 is a block diagram of a communication device 200 according to an embodiment of the disclosure. The communication device 200 may be any device suitable for communication on one or more spread-spectrum channels, such as, for example, radios, base stations, wireless routers, user equipment such as computers, tablet devices, smart phones, smart watches, automobile communication devices, internet of things (IoT) devices, and other communication devices. The communication device 200 may be configured as both a transmitter and a receiver. Thus, using the term "receiver" indicates that a device is configured to receive wireless signals as described herein, but should not be interpreted to mean that the communication device 200 only operates as a receiver. Similarly, using the term "transmitter" indicates that the device is configured to transmit wireless signals as described herein, but should not be interpreted to mean that the communication device 200 only operates as a transmitter.

The communication device 200 may be configured to execute software programs containing computing instructions and may include one or more processors 212, memory 214, and other special purpose modules 216. The special purpose modules 216 may include circuitry, computing instructions, or a combination thereof. Other functional modules are also depicted. In general, all or a portion of the modules may be configured as circuitry, computing instructions, or a combination thereof. Some functions to be performed in connection with embodiments of the present disclosure may need to be performed in real-time or near real-time. As a result, specific circuitry may be utilized for some functions such that the functions are performed fast enough. However, some of these functions may be performed by software executed by the processor 212. Thus, the processor 212 may be configured for executing a wide variety of operating systems and applications including the computing instructions for carrying out embodiments of the present disclosure. The memory 214 may be used to hold computing instructions, data, and other information for performing a wide variety of tasks including performing embodiments of the present disclosure.

The communication device 200 may also include a group 250 of key processing modules may include a signal generator 252, a pulse shaping filter 254, a matched filter 256, and a max ratio combiner 258. Functions of these elements are discussed more fully below. On the transmitter side, the communication device 200 may include a spreader 220 configured to spread information 215 such as a data symbol to be transmitted to a remote device. The spreader 220 may feed signals to a modulator 230 to modulate the signals to one or more carrier frequencies and then sent through the circulator 296 for transmission on the antenna 298. On the receiver side, the communication device 200 may include a de-spreader 260 may be used to receive demodulated signals from a demodulator 240 to extract data symbols 219 sent by a remote device.

Figure 3:
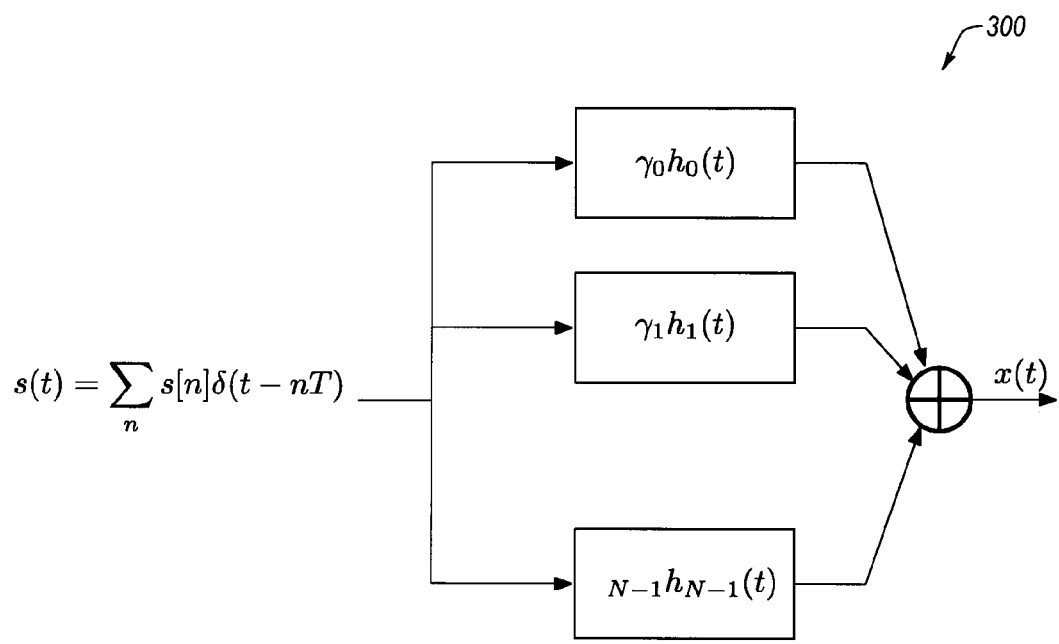
FIG. 3 is a block diagram of an FB-MC-SS transmitter according to an embodiment of the disclosure.

FIG. 3 is a block diagram of an FB-MC-SS transmitter 300 according to an embodiment of the disclosure. The transmitter 300 may be configured to generate an FB-MC-SS signal having a power level at or below a noise level. The noise level is a power level below which other communication signals being transmitted in the frequency spectrum would consider noise that would not have a significant impact on their communication signal. The FB-MC-SS signal may be considered an underlay control channel (i.e., "underlay," meaning it is below the noise level) with a relatively large number of subcarriers over the frequency spectrum. The number of subcarriers is generally selected to be a large number and may also be selected to be a power of two (i.e., $2^n$), such as, for example, 128, 2048, and 4096 subcarriers.

The FB-MC-SS signal includes a data symbol modulated onto each subcarrier. Moreover, the same data symbol is redundantly modulated onto each subcarrier. In other words, each subcarrier of the FB-MC-SS signal includes the same data. As a non-limiting example, the data symbol modulation may be as simple as a single bit modulated with binary phase shift keying (BPSK). In addition, more complex data symbol modulation techniques may be used for data symbols containing more data bits. For example, and without limitation, modulation techniques, such as quadrature phase shift keying (QPSK) and quadrature amplitude modulations (QAM), such as QAM 16, QAM 32, and QAM 64, may be used. Of course, these examples are intended to be non-limiting, and other data symbol modulation techniques are contemplated. Generally, the more simple modulation schemes may allow for easier data symbol recovery and may be more robust in embodiments transmitting at very low power levels.

The transmitter pulse-shaping filter g(t) may have an impulse response expressed as:

$$g(t) = \sum_{k=0}^{N-1} \gamma_k h_k(t) \qquad (1)$$

where $\gamma_k$ is the spreading gain at the kth subcarrier band, and $h_k(t)$ is a passband filter over the kth subcarrier band. The latter is related to a prototype filter h(t) having an impulse response:

$$h_k(t) = h(t)e^{j2\pi f_k t} \qquad (2)$$

where $f_k$ is the center frequency of the kth subcarrier band. In some embodiments, the prototype filter h(t) may be a low pass filter, such as a square-root Nyquist filter (e.g., square-root raised-cosine). The square-root Nyquist filter h(t) may be configured such that the zero-crossings of the Nyquist filter h(t)*h(t) are at the interval T. The square-root Nyquist filter may include a roll-off factor α=1 for a receiver with a desired suppression of out-of-band spectrum. Other choices of the roll-off factor (α) may be used, which may result in some modification to the receiver design. The spreading gain factors $\gamma_k$ are a set of complex numbers that may have a unit amplitude (i.e., $|\gamma_k|^2=1$) and phase angles that may be uniformly distributed over the interval 0 to $2\pi$. In some embodiments, the set of passband filters $h_k(t)$ may have mutually exclusive (i.e., non-overlapping) bands.

Referring specifically to FIG. 3, the input signal s(t) includes a train of data symbols s[n], spaced at interval T, that are passed through the pulse-shaping filter g(t) to generate an output signal x(t) that is passed to the modulator. According to equation (1) the pulse-shaping filter g(t) comprises a bank of N passband filters $h_0(t)$, $h_1(t)$, . . . , $h_{N-1}(t)$, with center frequencies $f_0, f_1, \ldots, f_{N-1}$. Considering equation (1), the impulse response of the standard matched filter is given by:

$$g^*(-t) = \sum_{k=0}^{N-1} \gamma_k^* h_k^*(-t). \tag{2}$$

Moreover, considering equation (2) and that in practical designs $h(-t)=h(t)$ (e.g., ignoring the causality of the impulse response) and $h_k^*(-t)=h_k(t)$. Hence:

$$g^*(-t) = \sum_{k=0}^{N-1} \gamma_k^* h_k(t). \tag{4}$$

With equations (1), (2), and (4), the combined response of the transmitter pulse-shaping filter and the standard matched filter at the receiver may be:

$$\eta(t) = \left(\sum_{k=0}^{N-1} \gamma_k h(t) e^{j2\pi f_k t}\right) \star \left(\sum_{l=0}^{N-1} \gamma_l^* h(t) e^{j2\pi f_l t}\right) \tag{5}$$

where * denotes linear convolution.

By design the passband filters $h_k(t)=h(t)e^{j2\pi f_k t}$ and $h_l(t)=h(t)e^{j2\pi f_l t}$ may be considered as a pair of bandpass filters. Such a pair of passband filters may either have a common band (e.g., when $f_k=f_l$) or cover non-overlapping bands. In the latter case $h(t)e^{j2\pi f_k t} \star h(t)e^{j2\pi f_l t}=0$. Hence, equation (5) above may be reduced to:

$$\eta(t) = \sum_{k=0}^{N-1} |\gamma_k|^2 (h(t) e^{j2\pi f_k t} \star h(t) e^{j2\pi f_k t}). \tag{6}$$

Manipulating equation (6), and recalling that $|\gamma_k|^2=1$, yields:

$$\eta(t) = \beta(t)\rho(t) \tag{7}$$

where $\rho(t)=h(t)*h(t)$, by design, is a Nyquist filter, and $$\beta(t) = \sum_{k=0}^{N-1} e^{j2\pi f_k t}. \tag{8}$$

In FB-MC-SS, the subcarrier frequencies $f_k$ are given the values:

$$f_0 = -\frac{N-1}{T}, \; f_1 = -\frac{N-3}{T}, \; \ldots, \; f_{N-1} = \frac{N-1}{T} \tag{9}$$

where T is the time interval between the data symbols s[n]. Substituting these frequency values in equation (8) yields:

$$\beta(t) = \sum_{k=0}^{N-1} e^{j2\pi(N-2k-1)t/T}. \tag{10}$$

Thus, $\beta(t)$ is a periodic function with a period of T.

Figure 4:
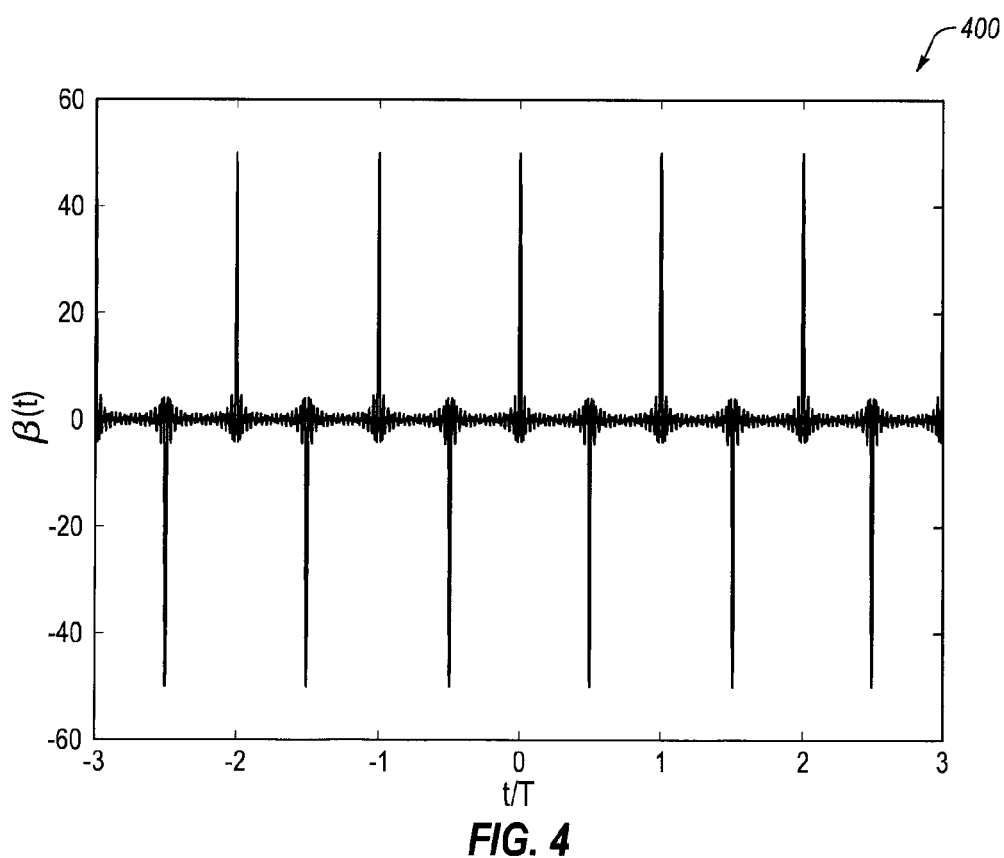
FIG. 4 is a plot of $\beta(t)$ when N=50 that is plotted over t/T.

FIG. 4 is a plot 400 of $\beta(t)$ when N=50 that is plotted over t/T. As mentioned above, $\beta(t)$ is a periodic function with a period of T. For t=nT, the exponential terms under the summation in equation (10) have the phase of zero (or some multiple of $2\pi$). Thus, the exponential terms constructively add to a peak of N. For $$t = nT + \frac{T}{2},$$

on the other hand, these phases may have a phase of $\pi$ (or some multiple of $2\pi$ plus $\pi$). Hence, the summation on the right-hand side of equation (10) will be equal to −N. In between these positive and negative peaks, $\beta(t)$ is reduced to a small value.

Figure 5:
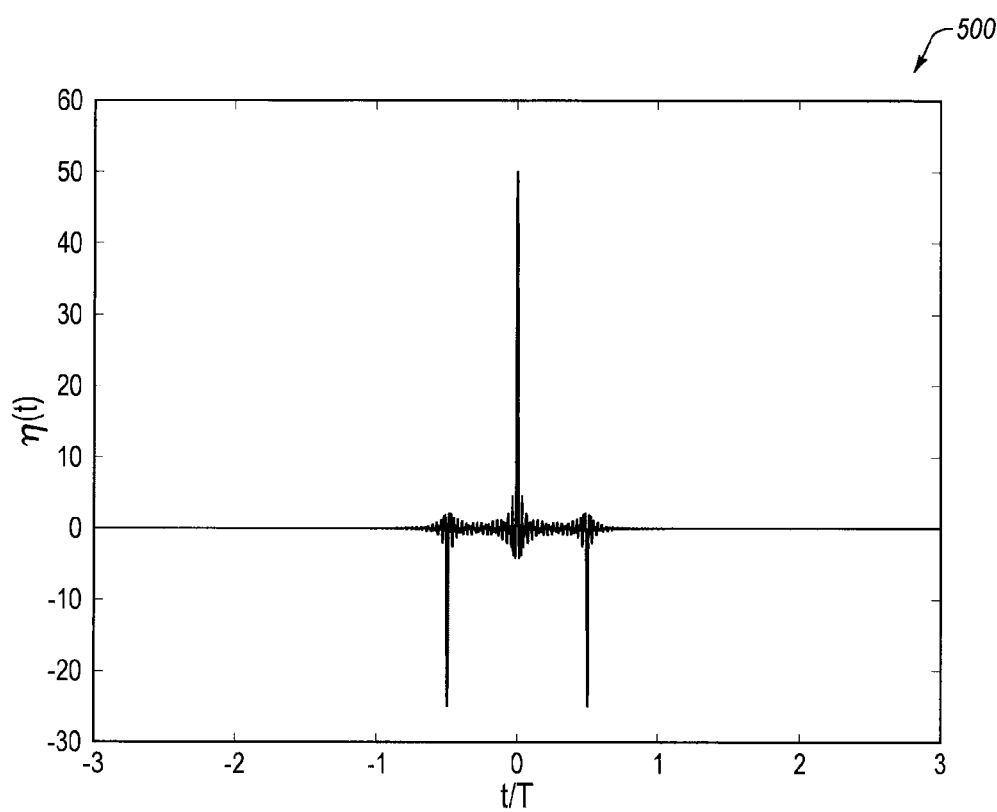
FIG. 5 is a plot of $\eta(t)$ when N=50 that is plotted over t/T.

FIG. 5 is a plot 500 of the combined response $\eta(t)$ of the transmitter pulse-shaping filter and the standard matched filter when N=50 that is plotted over t/T. Noting that $\rho(t)$ has a main lobe that spans over the range (−T, T) and some small negligible side lobes, the multiplication of $\beta(t)$ with $\rho(t)$ reduces to effectively three pulses as shown in FIG. 5. As a result, when the sequence of data symbols s[n] passes through the transmitter pulse-shaping filter g(t) and then through the matched filter at the receiver front-end, the result may be a sequence of persistent positive pulses or negative pulses depending on the sign of the transmitted data symbols s[n]. At the mid-points between these pulses, additional pulses may or may not appear depending of the similarity or dissimilarity of the pair of data symbols at the two sides of these mid-points.

Figure 6:
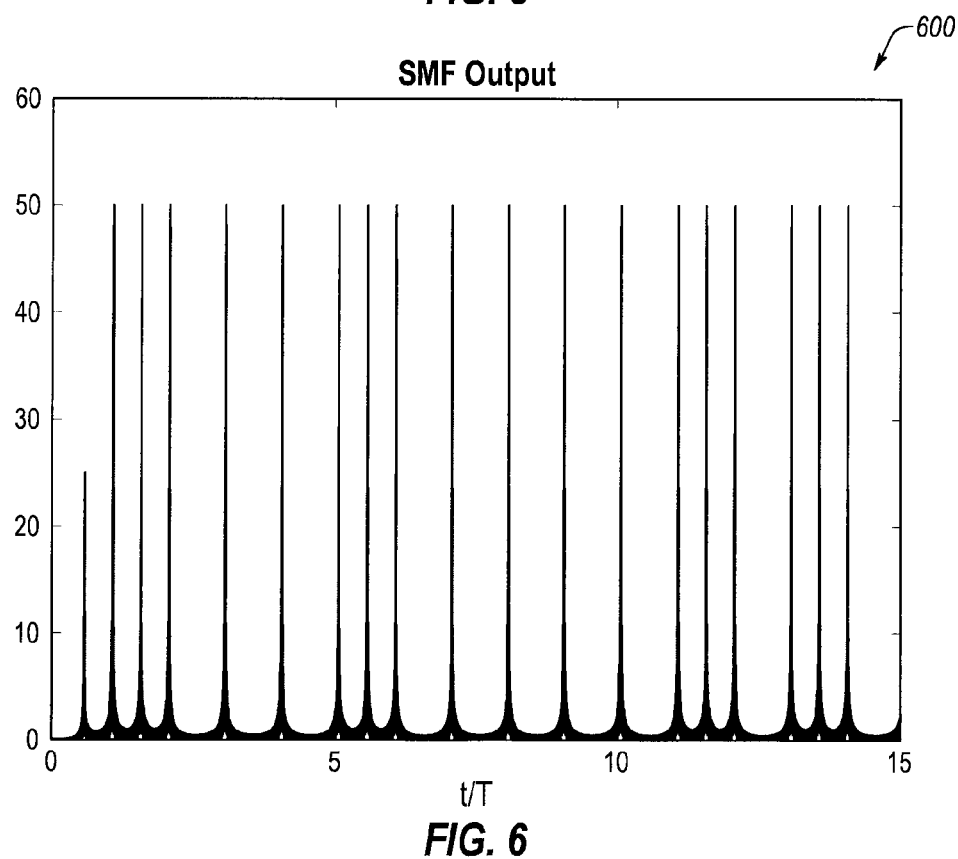
FIG. 6 is a plot of the magnitude of an output signal from a standard matched filter at the receiver for a single-path channel.

FIG. 6 is a plot 600 of the magnitude of an output signal from the standard matched filter (SMF) at the receiver for a single-path channel (e.g., under ideal conditions) when a random sequence of binary symbols is passed through the system and there is an ideal channel between the transmitter and receiver.

Figure 7:
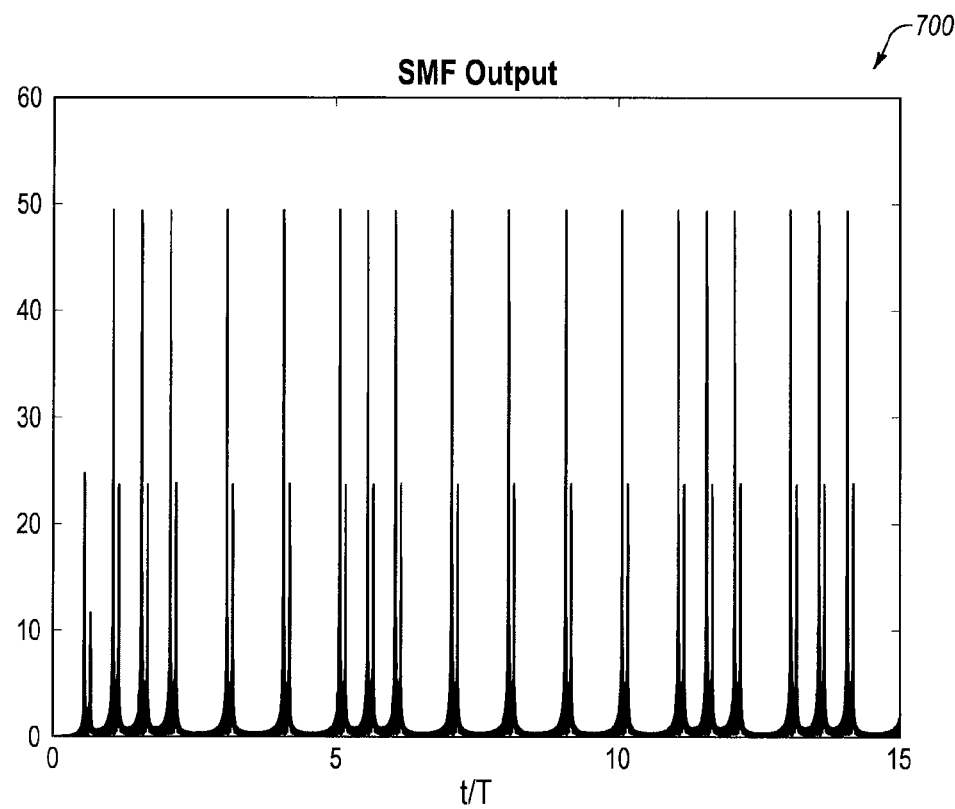
FIG. 7 is a plot of the magnitude of a standard matched filter output for a two-path channel.

FIG. 7 is a plot 700 of the magnitude of the standard matched filter (SMF) output for a two-path channel (e.g., under ideal conditions). The presence of a multipath channel leads to a cluster of pulses instead of each of the pulses in FIG. 6. Any algorithm that can identify the presence of these regular/periodic clusters of pulses, such as the pulses shown in FIG. 7, may be used to identify the presence of an incoming FB-MC-SS data packet. Moreover, the position of these clusters provides information about a timing phase for a fair recovery of the data symbols. The article by Sibbett et al., *Novel maximum-based timing acquisition for spread-spectrum communications*, presented at IEEE Globecom 2016 conference, proposes an algorithm for these tasks; namely, packet detection and timing acquisition. This article by Sibbett et al. is hereby incorporated herein in its entirety by this reference.

Figure 8A:
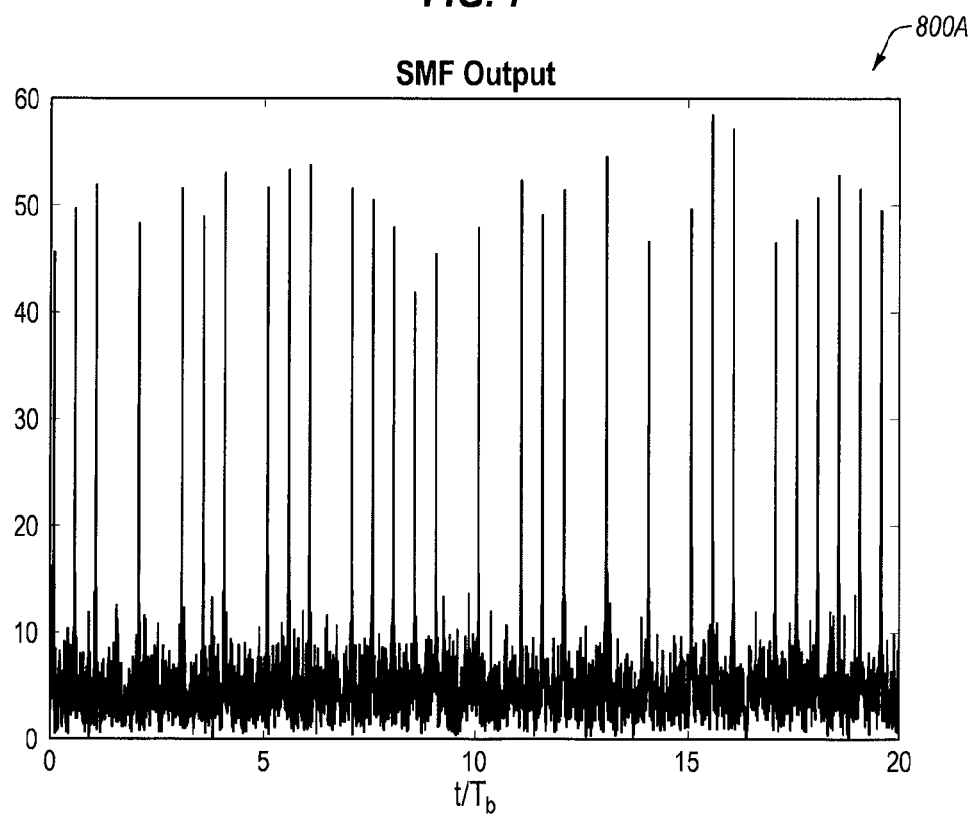
FIGS. 8A, 8B, and 8C are plots showing the magnitude of a standard matched filter output when the channel has corrupted the received signal for additive white Gaussian noise (AWGN) at various signal-to-noise (SNR) levels.
Figure 8B:
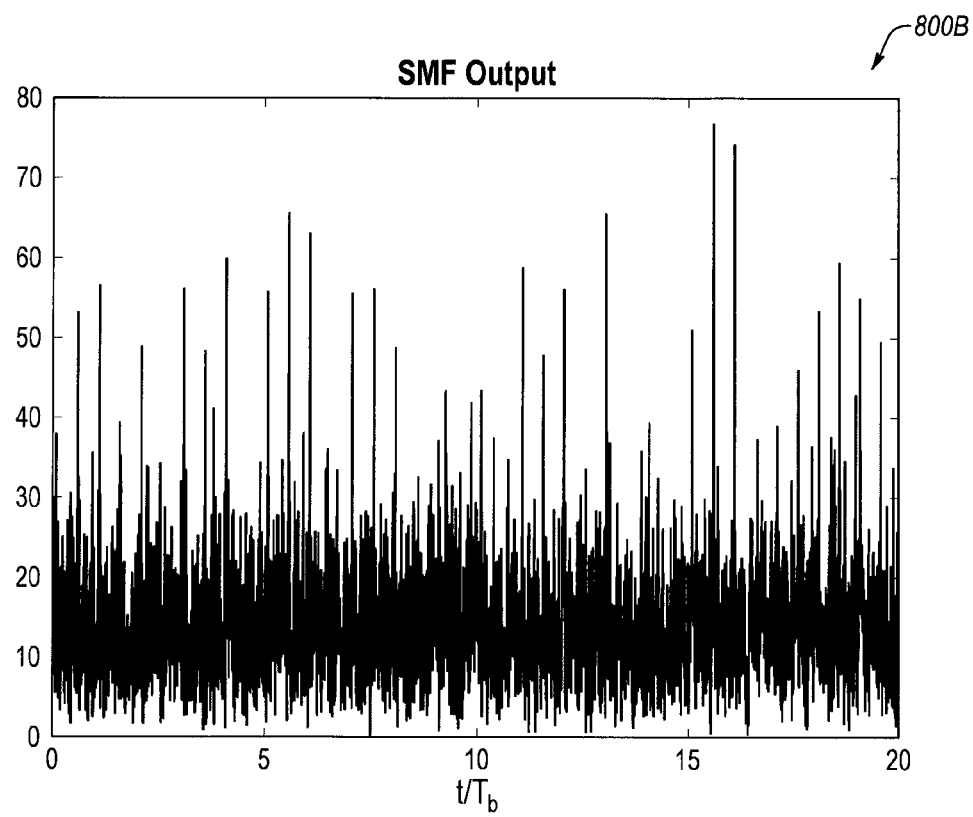
Figure 8C:
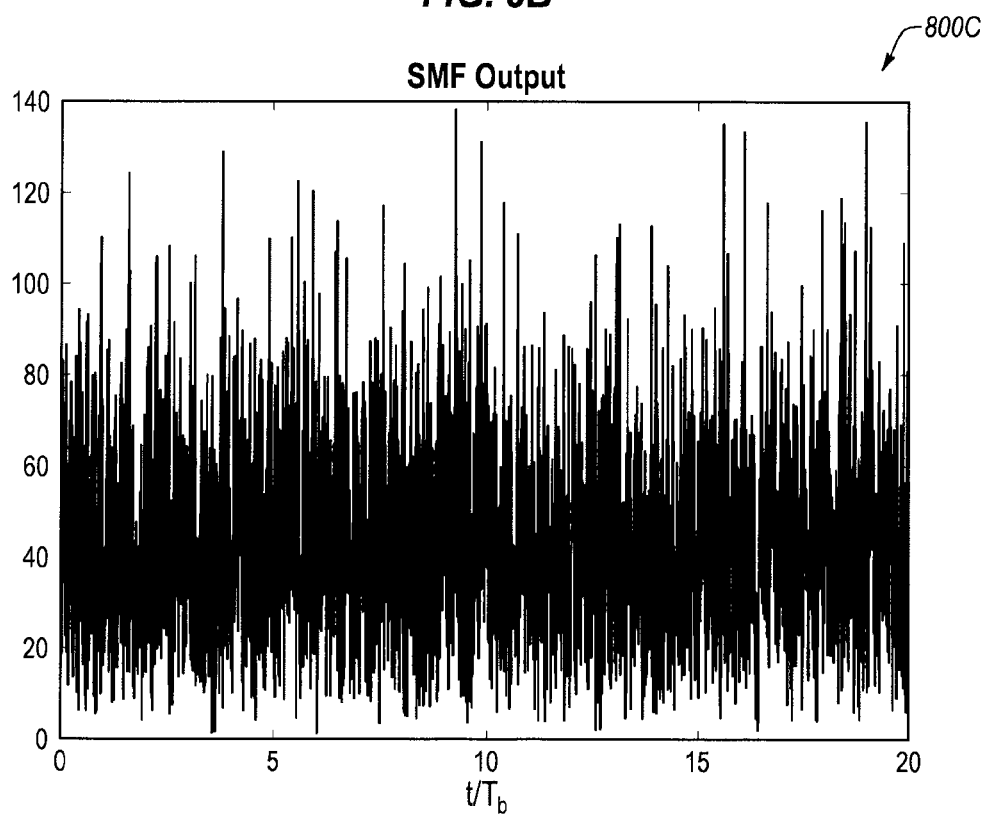

In a practical channel, the environment (e.g., noise and interference) adds to the received signal and if noise and/or interference passes a certain level, it can seriously corrupt the received signal and as a result packet detection and timing acquisition may become a difficult task to perform. For example, FIGS. 8A, 8B, and 8C are plots 800A, 800B, 800C that present three cases where the received signal is corrupted by additive white Gaussian noise (AWGN) at signal-to-noise ratio (SNR) values of 0 dB, −10 dB, and −20 dB, respectively. As seen, the regular pulses at the standard matched filter output become less observable (e.g., will be masked out) as the SNR decreases, and naturally the pulses become essentially undetectable as the SNR drops below a certain value. The SNR value at which the pulses become undetectable may be lowered by increasing the processing gain of FB-MC-SS (e.g., equivalently, by increasing the number of active subcarriers N).

Referring specifically to FIG. 8A, plot 800A shows the magnitude of the standard matched filter output when the channel has corrupted the received signal by AWGN at SNR level of 0 dB. FIG. 8B is a plot 800B showing the magnitude of the standard matched filter output when the channel has corrupted the received signal with an AWGN at SNR level of −10 dB. FIG. 8C is a plot 800C showing the magnitude of the standard matched filter output when the channel has corrupted the received signal with an AWGN at SNR level of −20 dB.

In another scenario, the AWGN at the channel output may be at a level that does not mask out the regular pulses at the standard matched filter output, but there is a strong partial-band interference at a considerably higher level that may completely mask out the regular pulses at the standard matched filter output. This scenario may be more likely to happen in a harsh environment such as where a jammer may introduce some narrow/partial band interference, or in a case where the FB-MC-SS is used as an underlay control channel in a cognitive radio system. In the latter scenario, overlay communications may introduce some high level partial band interference. Thus, depending on the environment the communication signals may be hidden within the noise such that the receiver may not be able to distinguish them.

Figure 9:
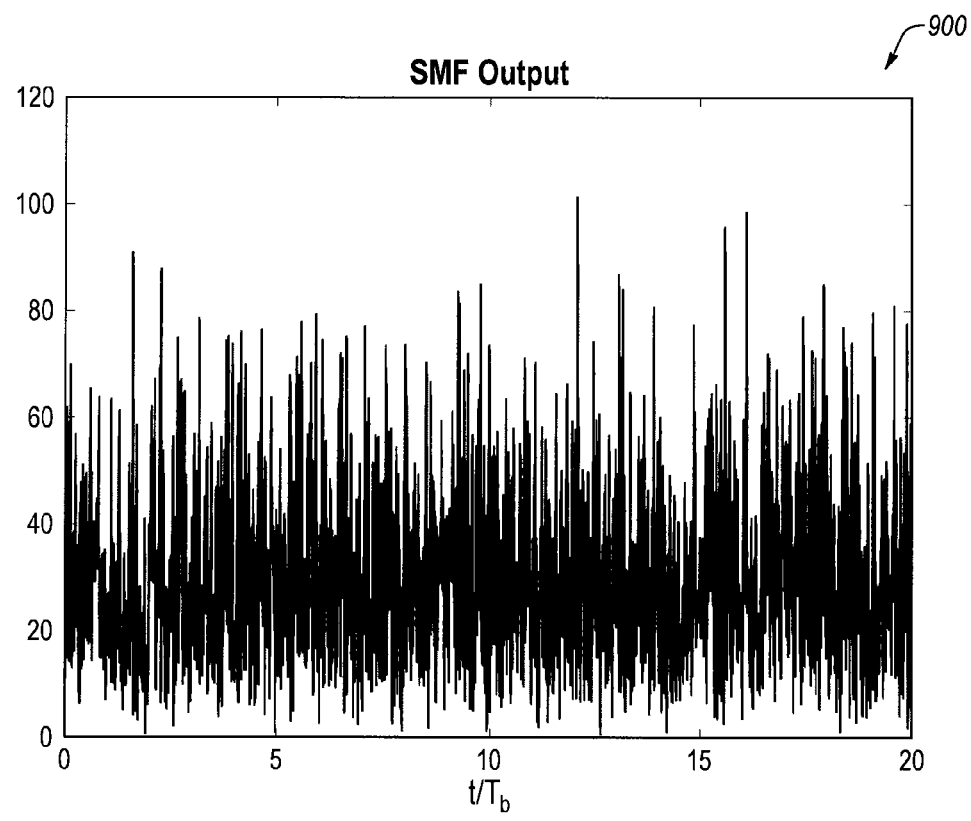
FIG. 9 shows a plot of the magnitude of the standard matched filter output in a case where the received signal is corrupted in a harsh environment.

FIG. 9 shows a plot 900 of the magnitude of the standard matched filter output in a case where the received signal is corrupted in a harsh environment, such as by AWGN at 0 dB SNR and a partial-band interference over 50% of the transmission band at 20 dB above the signal level. In this case, the regular pulses at the standard matched filter output are masked out by the partial band interference. Without partial band interference (i.e., at the presence of AWGN with 0 dB SNR), the result would be the one presented in FIG. 8A. However, as shown in FIG. 9, the standard matched filter may not provide a discernable output for such harsh environments.

Embodiments of the disclosure may provide an improvement over the standard matched filter in this scenario, which may be referred to as the normalized matched filter. When the incoming signal is corrupted by a partial band interference at a level that otherwise masks out the regular pulses at the standard matched filter output, the normalized matched filter may be configured to suppress the partial band interference and cause the regular pulses at the output of the normalized matched filter more clearly observable.

The normalized matched filter is described more fully below, and is based on the following understanding of the standard matched filter and the mechanism that leads to the regular pulses at its output. The mathematical equations (5) through (10) provide some details that explain how these regular pulses are generated. In particular, each subcarrier has a contribution to one of the complex exponentials that together produce the periodic signal β(t) that is presented by equation (10). It is also recalled that the sample plot of β(t) presented in FIG. 4, and that the positive pulses in FIG. 4 correspond to the time points where all the exponential terms in equation (10) have the phase of zero (or some multiples of 2π). This is a situation where all the terms under summation on the right-hand side of equation (10) are equal to +1 and, thus, add up to a value of N. On the other hand, the negative pulses in FIG. 4 correspond to the time points where all the exponential terms in equation (10) have the phase of π (or some multiples of 2π plus π). This is a situation where all the terms under summation on the right-hand side of equation (10) are equal to −1 and, thus, add up to a value of −N.

The interference suppression of the normalized matched filter is implemented in the frequency domain. Although any frequency domain signal processing may be adopted, the description focuses on the method of overlap-add signal processing. The normalized matched filter will be described below, after a brief review of the overlap-add method. The overlap-add method implements the time domain filtering operation y[n]=x[n]*g[n], where x[n] is the input sequence and g[n] is a finite impulse response filter, in the frequency domain, by taking the following operations:

In a first operation, x[n] is partitioned into adjacent segments of length P. The segments are called $x_1[n]$, $x_2[n]$, . . . . In a second operation, assuming g[n] has a length of M, g[n] may be zero-padded to the length L≥P+M−1. The fast Fourier transform (FFT) of this zero-padded version of g[n] is a sequence of length L and will be named G[k] herein. In a third operation, for i=1, 2, . . . , repeat the following steps: (a) zero-pad $x_i[n]$ to the length of L, and take its FFT with the FFT result being $X_i[k]$, (b) form the frequency domain sequence $Y_i[k]=X_i[k]G*[k]$. This is the matched filtering operation, and (c) convert $Y_i[k]$ to the time domain by applying an inverse FFT (IFFT) to it. Call the result $y_i[n]$. In a fourth operation, the output y[n] may be formed by time-aligning the segments $y_1[n]$, $y_2[n]$, . . . to the positions that match those of the input segments $x_1[n]$, $x_2[n]$, . . . and adding the results. This overlap-add procedure is a linear filtering operation.

Embodiments of the disclosure include a normalization process added to the matched filtering operation to form a normalized matched filter configured to reject partial band interference from the input signal. For example, using the example above, in operation (a) of the preceding paragraph, the generated frequency domain samples $X_i[k]$ provide the information about the spectral content of the time-domain signal segment $x_i[n]$. The FFT result $X_i[k]$ may also be divided into a number of partitions, with each partition covering one of the subcarrier bands in the FB-MC-SS signal. The subcarrier bands that are interfered with a strong interference may be characterized by a subset of samples of $X_i[k]$ with large amplitude. To suppress interference in individual subcarrier bands, for each subcarrier band, the corresponding samples of $X_i[k]$ may be normalized to a power of unity. Assuming that a given subcarrier band is characterized by the frequency index set $k_1 \leq k \leq k_2$, the set of normalized samples are obtained as:

$$\tilde{X}_i[k] = \frac{X_i[k]}{\sqrt{\sum_{k=k_1}^{k_2} |X_i[k]|^2}}, \text{ for } k_1 \leq k \leq k_2. \quad (11)$$

Repeating this normalization process for all the subcarrier bands, the sample set $X_i[k]$, for k=0, 1, 2, . . . , L−1, is replaced by the corresponding normalized sample set $\tilde{X}_i[k]$. Accordingly, after operation (a), the rest of the overlap-add method may continue with the normalized sample set $\tilde{X}_i[k]$ in place of the original sample set $X_i[k]$. By normalizing the samples of the overlap-add method, the portions of the signal spectral may be attenuated that belong to the subcarrier bands that are interfered with a stronger interference. As a result, the interference may also be attenuated proportionally. Thus, employing a normalized matched filter may result in an improvement in comparison with a standard matched filter. This modified overlap-add method is a non-limiting example of a particular implementation of the normalized matched filter. Alternative methods are contemplated and would be apparent to those skilled in the art of signal processing. For example, it is contemplated that an alternative normalized matched filter may be utilized based on the overlap-save method.

Figure 10A:
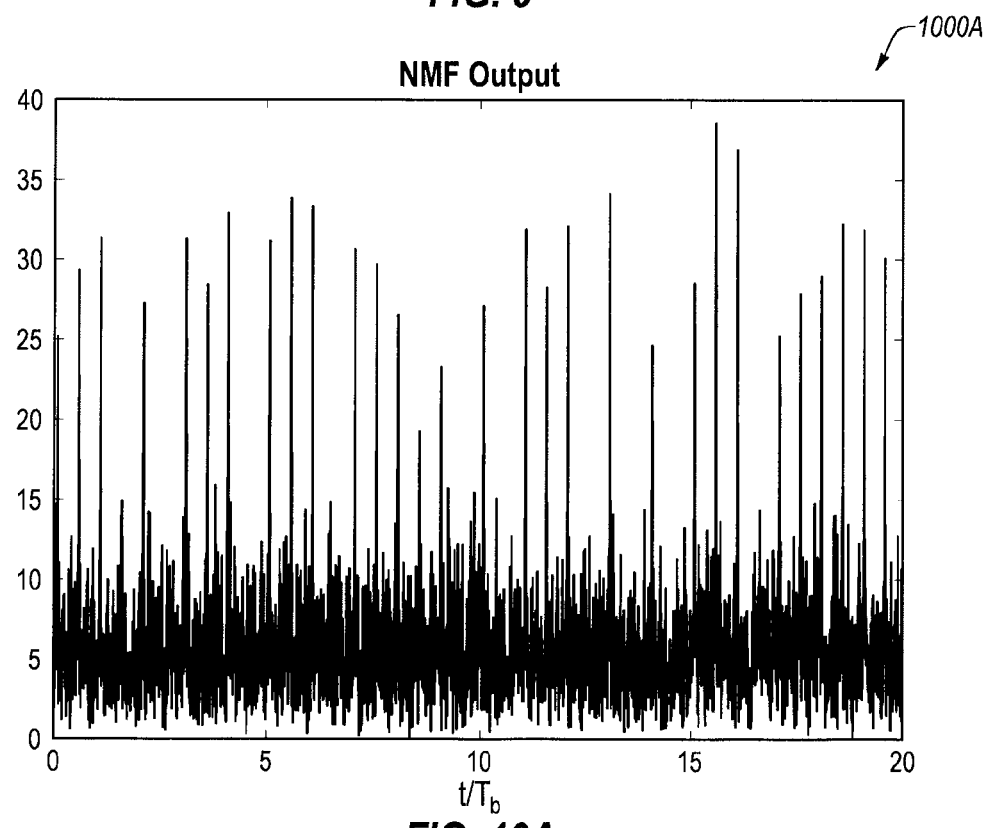
FIGS. 10A, 10B, 10C are plots showing the magnitude of the normalized matched filter output for various harsh environments.
Figure 10B:
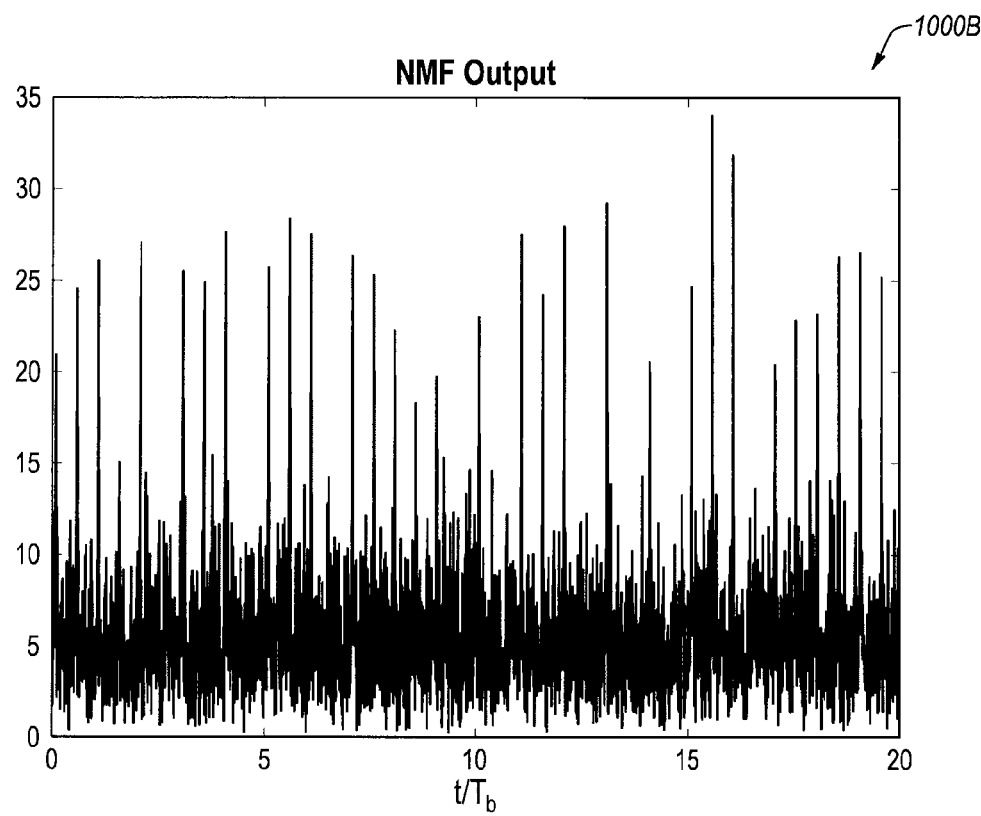
Figure 10C:
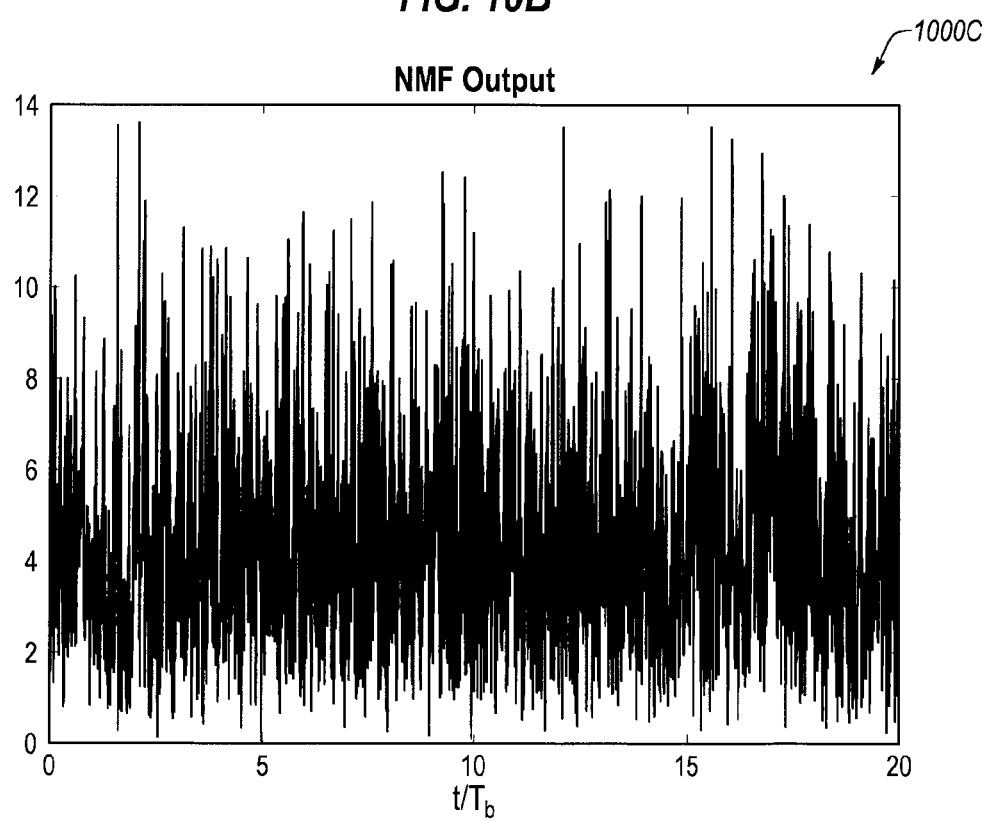

FIGS. 10A, 10B, 10C are plots 1000A, 1000B, 1000C showing the magnitude of the normalized matched filter output for various harsh environments. In particular, the received signal is an FB-MC-SS signal that is corrupted by an AWGN at SNR of 0 dB, plus an interference signal that occupies 50% of the transmission band at levels 20 dB, 30 dB, and 50 dB above the signal level, for FIGS. 10A, 10B, and 10C, respectively. The prototype filter for each of FIGS. 10A, 10B, and 10C is a rectangular window.

Whereas the standard matched filter may fail to reveal the regular pulses at its output, the normalized matched filter may remove most of the interference from its output. As a result, pulses may be observed and recoverable in most of the scenarios. The exception is the case where interference has a very high power in which the interference may not be sufficiently removed (e.g., the case presented in FIG. 10C).

Another embodiment described more fully below may further improve the ability to reduce the interference in harsh environments. To understand this improvement, a brief explanation is described herein as to the impact of the subcarrier power normalization in introducing any distortion to the regular pulses at the matched filter output. Equation (5) above describes the combined impulse response between the transmitter input and the standard matched filter output, assuming an ideal channel. By replacing the standard matched filter with the normalized matched filter, the corresponding combined impulse response will be:

$$\eta(t) = \left(\sum_{k=0}^{N-1} \gamma_k h(t) e^{j2\pi f_k t}\right) \star \left(\sum_{l=0}^{N-1} A_l \gamma_l^* h(t) e^{j2\pi f_l t}\right) \quad (12)$$

where $A_l$ is the real and positive normalization factor applied to the frequency domain samples in the lth subcarrier band. Following the same line of derivations that led to equations (7) and (10) above, equation (12) can also be simplified to the same form as equation (7), with:

$$\beta(t) = \sum_{k=0}^{N-1} A_k e^{j2\pi(N-2k-1)t/T}. \quad (13)$$

Similar to the standard $\beta(t)$ in equation (10), the normalized $\beta(t)$ in equation (13) is also a periodic function of time. Taking note that the coefficients $A_k$ are real and positive, the periodic function of normalized $\beta(t)$ in equation (13) has almost the same form (i.e., a sequence of positive and negative impulses) as the standard $\beta(t)$ in equation (10). For t=nT, the exponential terms under the summation in equation (13) may have the phase of zero (or some multiples of $2\pi$), and thus constructively add to a peak of $$\sum_k A_k. \text{ For } t = nT + \frac{T}{2},$$

on the other hand, these phases have the value of $\pi$ (or some multiples of $2\pi$ plus $\pi$), hence, the summation in the right-hand side of equation (13) will be equal to $-\Sigma_k A_k$. In between these positive and negative peaks, normalized $\beta(t)$ vanishes to a small value.

Figure 11:
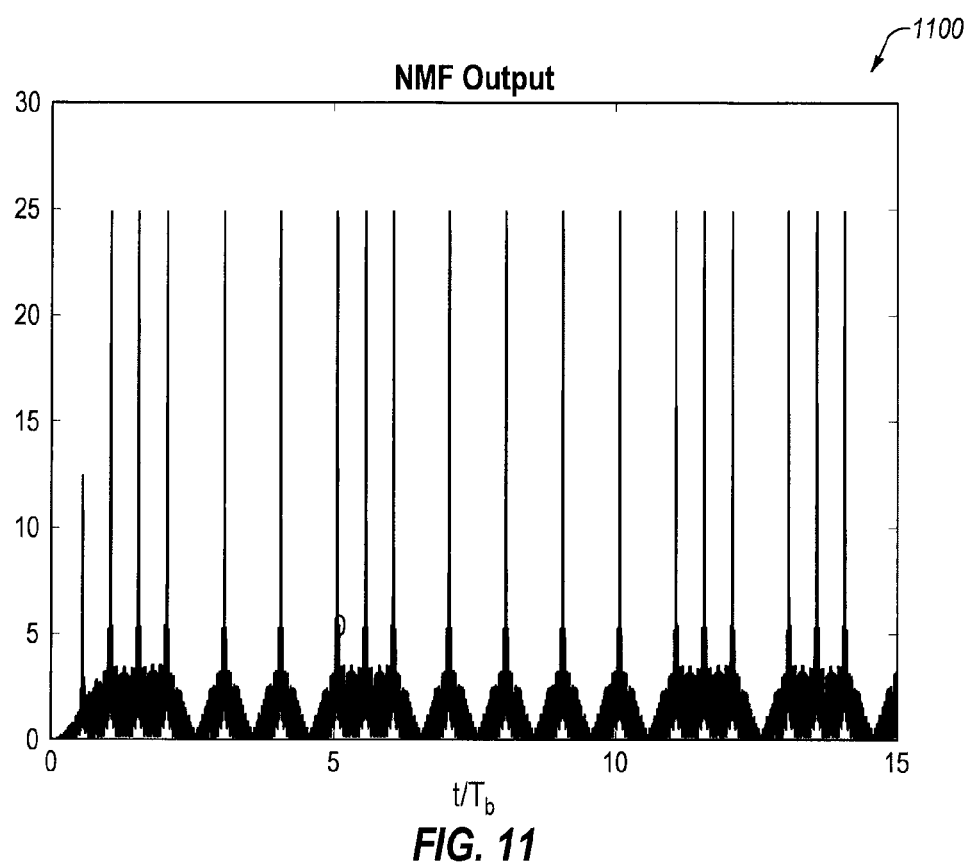
FIG. 11 is a plot of normalized periodic function $\beta(t)$ according to an embodiment of the disclosure.

FIG. 11 is a plot 1100 of normalized periodic function $\beta(t)$ according to an embodiment of the disclosure. For this example, the normalization coefficients $A_k$ are a set of random numbers uniformly distributed over the interval 0 to 1, and the parameter N is equal to 50.

The sample set $X_i[k]$, for k=0, 1, . . . , L−1, are effectively a snap-shot of the outputs of filter bank with a prototype filter p[n]. For the normalized matched filter that has been described so far, prototype filter p[n] is a rectangular window. For example, the prototype filter p[n] may be a finite impulse response filter of length P with prototype filter p[n]=1, for n=0, 1, . . . , P−1. This rectangular prototype filter p[n] may have a frequency response that includes a sinc pulse. Such a sinc pulse whose magnitude response is presented in FIG. 12 may have a poor stopband attenuation. Therefore, the sinc pulse may pick up a significant amount of signal power from all parts of the spectrum. Accordingly, when a portion of the spectrum is corrupted by a high-power interference, this interference can impact (e.g., leak to) all samples of $X_i[k]$ and as a result may mask out the regular pulses at the output of the normalized matched filter. The results that were presented above in FIGS. 10A, 10B, and 10C give some idea of the impact of the rectangular prototype filter as interference power level increases.

Figure 12:
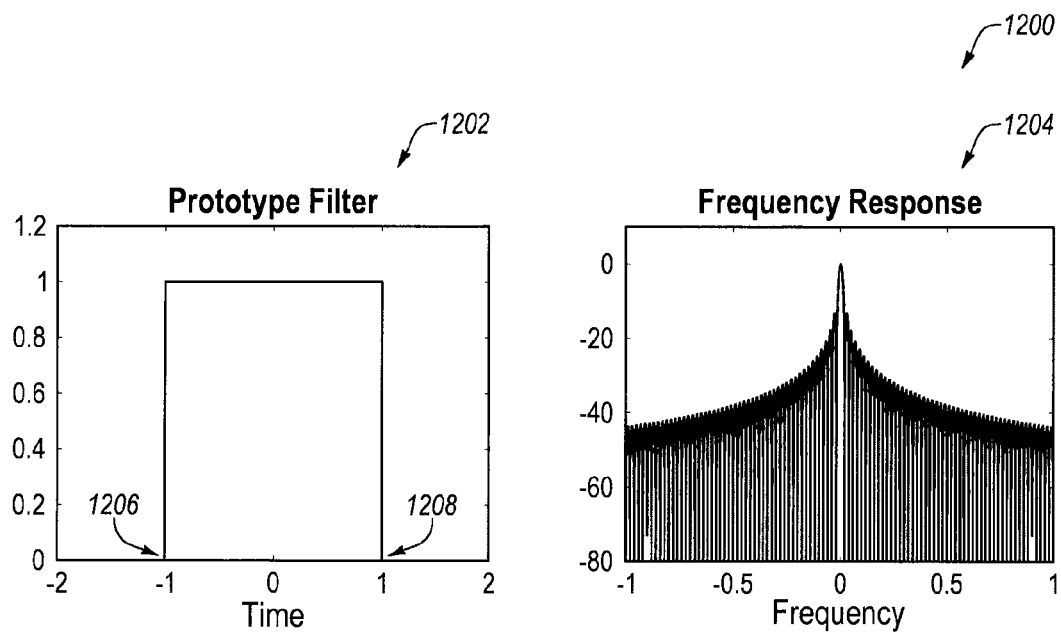
FIG. 12 is a plot showing a rectangular pulse characterizing a finite impulse response (FIR) filter with coefficients of 1 and its corresponding frequency response.

FIG. 12 is a plot 1200 showing a rectangular pulse 1202 characterizing an FIR filter with coefficients of 1 and its corresponding frequency response 1204. In the process of selecting a prototype filter p[n], the frequency response 1204 of a rectangular window in the frequency domain may be undesirable as a direct consequence of the sharp edges at the beginning and the end of the rectangular pulse 1202 for the prototype filter p[r].

Figure 13:
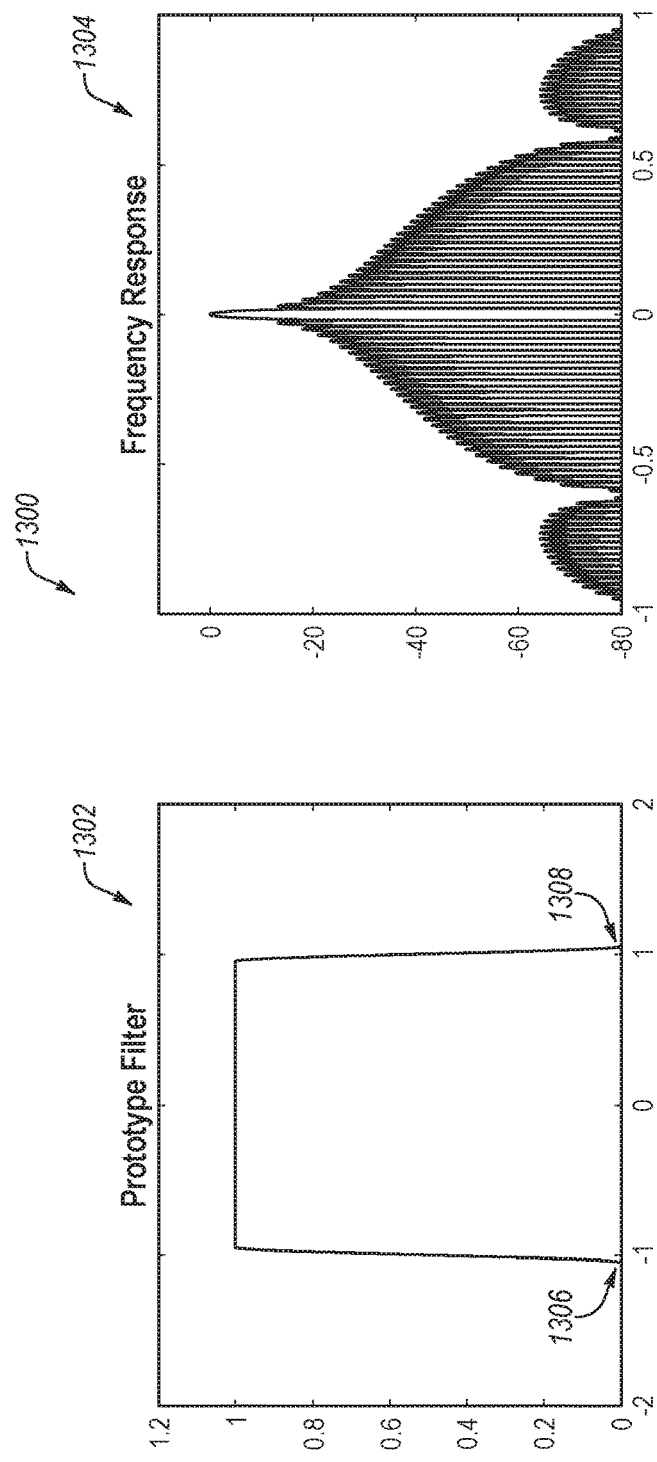
FIG. 13 is a plot showing a rectangular pulse with added roll-offs at its two sides characterizing an FIR filter and its corresponding frequency response.

FIG. 13 is a plot 1300 showing a rectangular pulse 1302 with added roll-offs 1306, 1308 at its two sides characterizing an FIR filter and its corresponding frequency response 1304. By adding smooth roll-offs to the beginning and the end of the rectangular pulse 1302 of the prototype filter p[n], the frequency response 1304 may be improved relative to FIG. 12, and as a result, the leakage of a high-power interference to other parts of the transmission band may be reduced. The addition of smooth roll-offs 1306, 1308 to the beginning and the end of a rectangular pulse 1302 that may improve on its frequency domain properties have been adopted in different applications of signal processing. For example, in orthogonal frequency division multiplexing (OFDM), roll-offs are added to the beginning and the end of each OFDM symbol to improve on the subcarriers out-of-band emissions, so that the signals transmitted from different user equipment nodes in the network minimally interfere with one another. Here, smooth roll-offs 1306, 1308 are added to the prototype filter p[n] to improve on the interference rejection of the normalized matched filter.

The addition of smooth roll-offs may also contribute to reducing the interference leakage. FIG. 12 presented a rectangular pulse 1202 as an FIR filter and its frequency response 1204. FIG. 13, on the other hand, presents a similar rectangular pulse 1302 as an FIR filter after adding raised-cosine roll-offs 1306, 1308 to the beginning and the end of it and its frequency response, respectively. The width of roll-offs in FIG. 13 may be approximately 5% of the width of the rectangular window. Even this small amount of roll-off may contribute to improving the stop-band attenuation of the respective frequency response (compare FIGS. 12 and 13) and, as a result, as will be shown through an example later, in reducing the interference leakage in the context of this invention (see description of FIGS. 19a and 19b, below).

Figure 14:
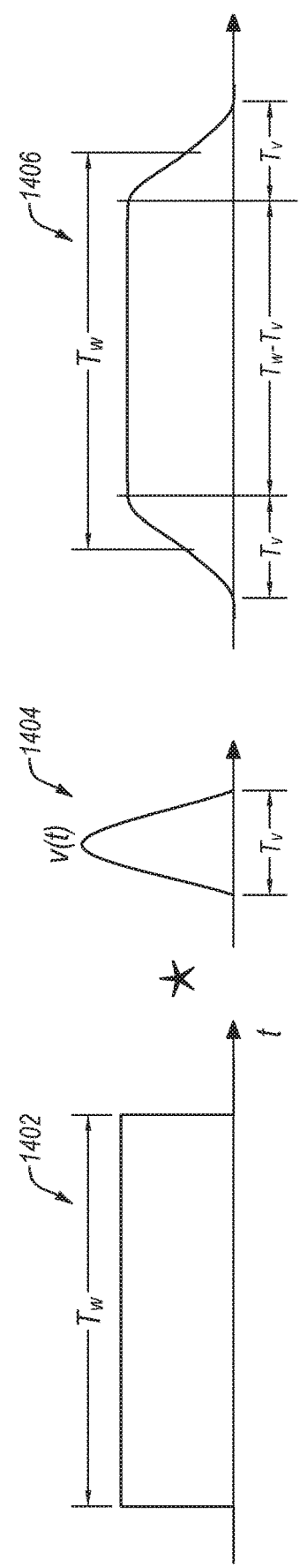
FIG. 14 is a visual representation of forming a window for a prototype filter according to an embodiment of the disclosure.

FIG. 14 is a visual representation of forming a window 1406 for a prototype filter p(t) with raise-cosine roll-offs at the beginning and the end of the window 1406 through convolution of a rectangular pulse 1402 and a half sine-wave 1404. The visual representation of FIG. 14 may be expressed mathematically as:

$$p(t) = \Pi\left(\frac{t - T_w/2}{T_w}\right) \star v(t) \quad (14)$$

where * denotes linear convolution, $$\Pi\left(\frac{t}{T_w}\right) = \begin{cases} 1, & |t| < \frac{T_w}{2} \\ 0, & \text{otherwise} \end{cases} \quad (15)$$

and $$v(t) = \frac{\pi}{2T_v} \sin\left(\frac{\pi t}{T_v}\right) \Pi\left(\frac{t - T_v/2}{T_v}\right). \quad (16)$$

The factor $$\frac{\pi}{2T_v}$$

on the right-hand side of (16) may be selected such that the identity $$\int_{-\infty}^{\infty} v(t)dt = 1$$

holds. Applying a Fourier transform to both sides of (14):

$$P(f) = T_w \operatorname{sinc}(fT_w) \times V(f) \quad (17)$$

where $$V(f) = \frac{\cos(\pi f T_v)}{1 - 4f^2 T_v^2} \quad (18)$$

Figure 15A:
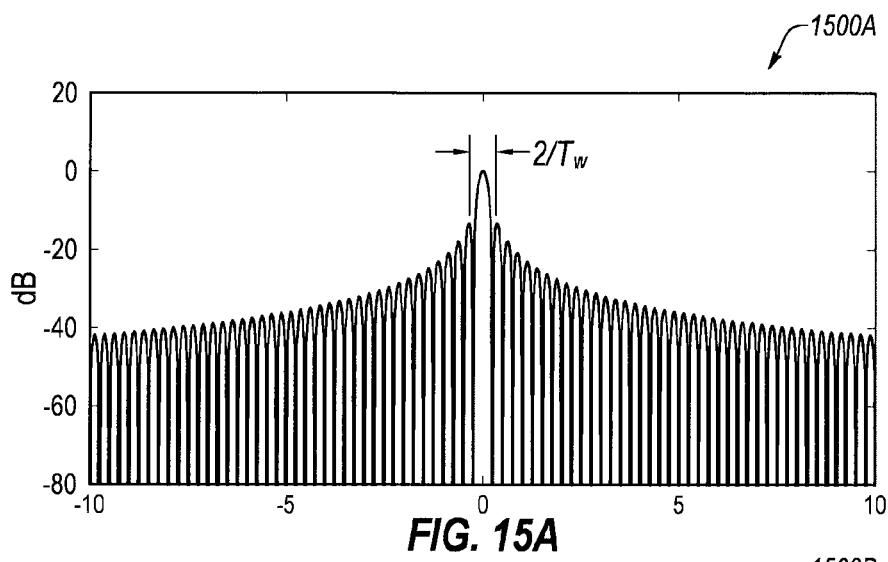
FIGS. 15A, 15B, and 15C present a set of sample plots the magnitude of a prototype filter in the frequency domain.
Figure 15B:
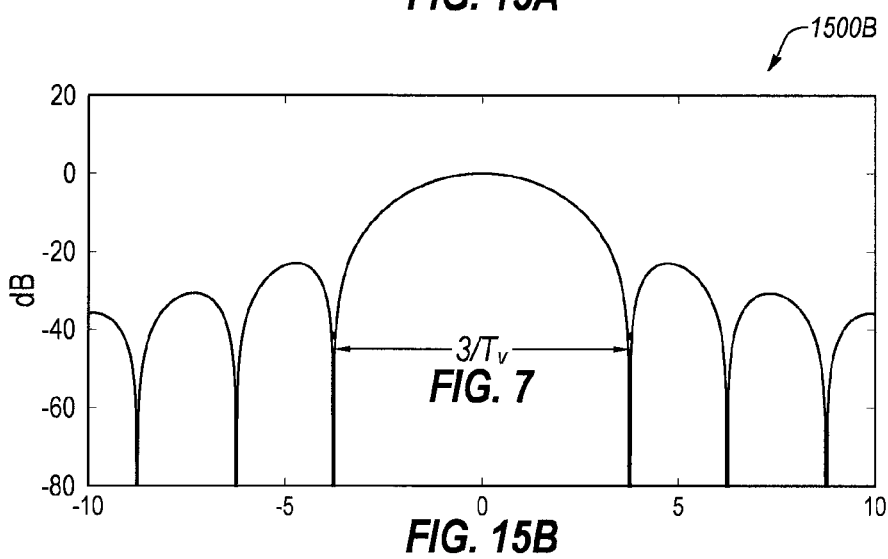
Figure 15C:
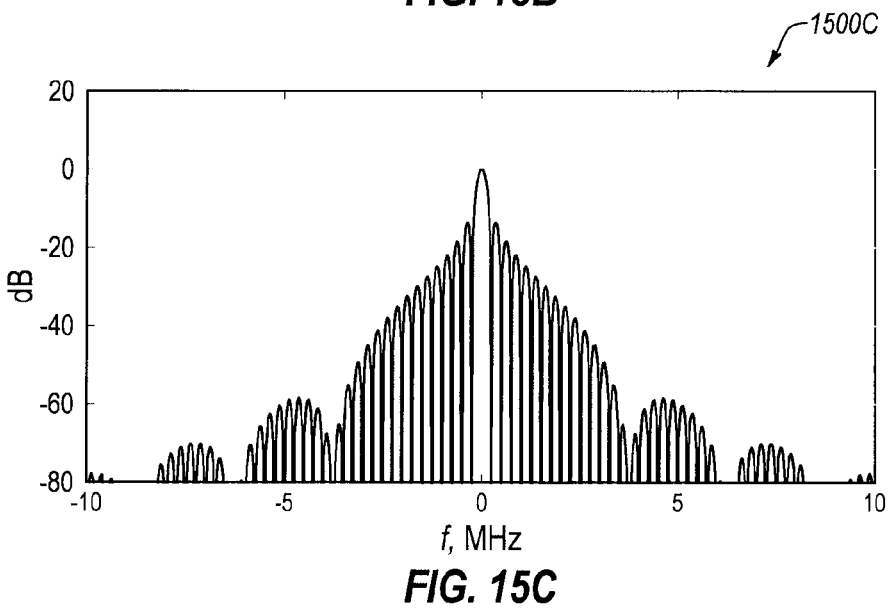
Figure 16:
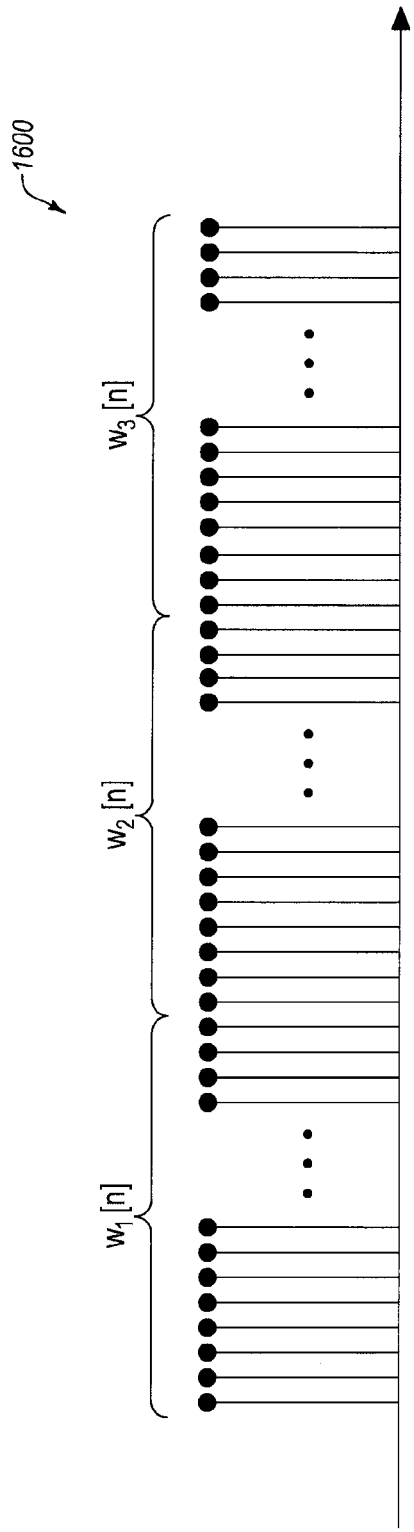
FIG. 16 shows a set of rectangular windows that may be applied to an incoming signal to extract partitions.

FIGS. 15A, 15B, and 15C present a set of sample plots 1500A, 1500B, 1500C the magnitude of a prototype filter in the frequency domain. In particular, plot 1500A shows |sinc(fT$_w$)|, plot 1500B shows |V(f)|, and FIG. 16 shows $$\frac{1}{T_w} P(f) = |\operatorname{sinc}(fT_w)| \times |V(f)|.$$

The prototype filter P(f) is a low-pass filter characterized by a narrow-band main lobe, a number of significant side lobes that expand over a bandwidth of $$\frac{3}{T_v},$$

and a number of well-attenuated side lobes at higher frequencies. If the stopband of the prototype filter is over the frequencies in which $$\frac{1}{T_w} P(f)$$

is −50 dB or less, its transition band may exhibit a width of about $$\frac{3}{T_v}$$

as shown in FIG. 15B. This may give an idea of how far (in frequency) a high-power interferer may have noticeable impact on other parts of the spectrum.

FIG. 16 shows a set 1600 of sampled rectangular windows $w_1[n], w_2[n], w_3[n], \ldots$ that may be applied to an incoming signal x[n] to extract the partitions $$x_1[n] = w_1[n]x[n], x_2[n] = w_2[n]x[n], x_3[n] = w_3[n]x[n], \ldots .$$

The windows may be non-overlapping, but, in order not to miss any samples of x[n], the windows may be adjacent to each other.

Figure 17:
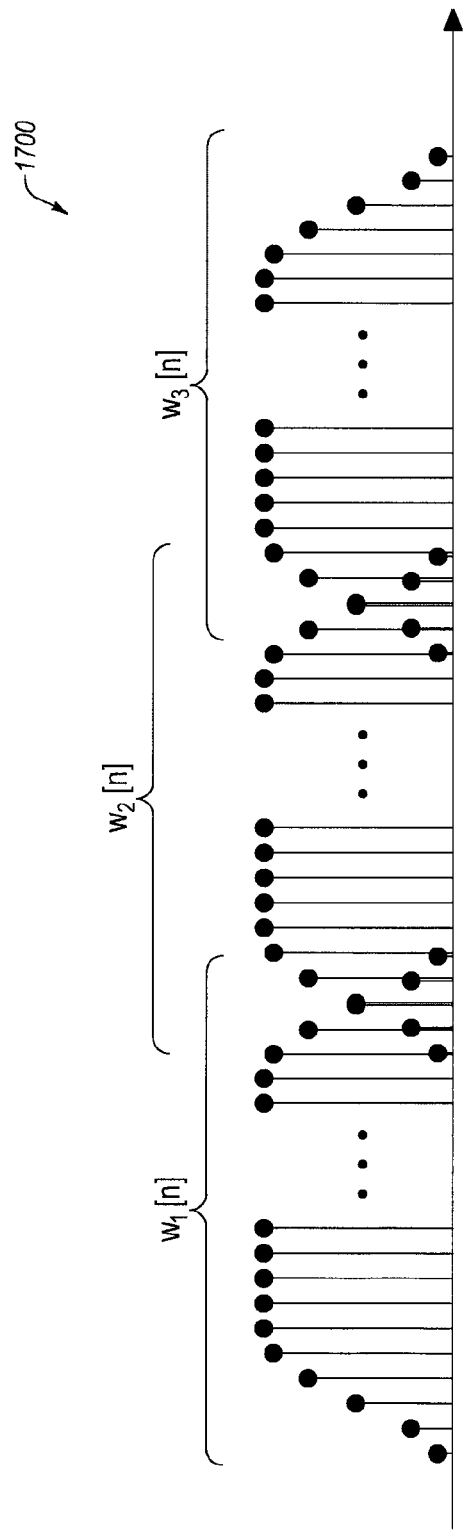
FIG. 17 shows a set of rectangular windows with raised-cosine roll-offs at the beginning and the end of them for extracting successive partitions of an incoming signal x[n].

FIG. 17 is a set 1700 of sampled rectangular windows $w_1[n], w_2[n], w_3[n], \ldots$ that include the added roll-offs at the beginning and the end of windows. The rectangular windows $w_1[n], w_2[n], w_3[n], \ldots$ must be chosen such that:

$$\sum_i w_i[n]x[n] = x[n]. \quad (19)$$

factoring x[n] out of the summation on the left-hand side of equation (19), the result simplifies to:

$$\sum_i w_i[n] = 1. \quad (20)$$

For reference below, it is assumed that $w_0[n]$ (i.e., the window function of the $0^{th}$ partition) is non-zero over the interval 0≤n≤P−1. It is noted that that $w_0[n]$ is effectively the prototype filter p[n]. In addition, Q denotes the number of samples within each of the roll-off intervals. Therefore, recalling the window arrangements in FIG. 17, one finds that:

$$w_i[n] = p[n - i(P - Q)]. \quad (21)$$

Figure 18:
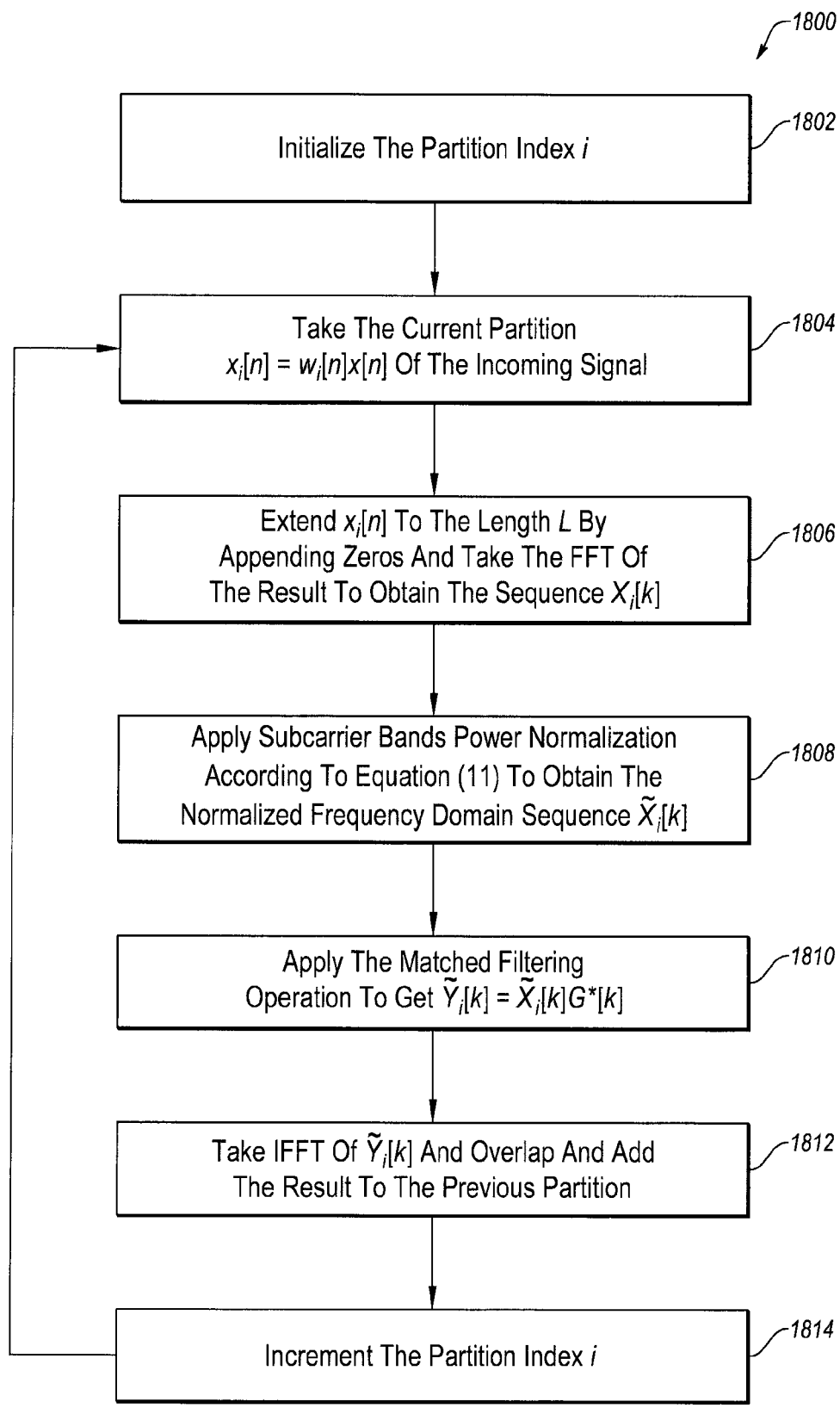
FIG. 18 is a flowchart illustrating a method of operating the normalized matched filter according to an embodiment of the disclosure.

FIG. 18 is a flowchart 1800 illustrating a method of operating the normalized matched filter according to an embodiment of the disclosure. At operation 1802, the partition index i may first be initialized. At operation 1804, the portion of the incoming signal that corresponds to the present partition index is taken and the relevant window is applied. The result is the length P sequence $x_i[n]$.

At operation 1806, $x_i[n]$ is extended to the length L>P by appending zeros to its end and an FFT is applied to the result to convert it to the frequency domain. This frequency domain signal is called $X_i[k]$. The FFT operation may be synthesis filter bank with a rectangular prototype filter. In another embodiment, the rectangular prototype filter may be replaced with a filter with lower out-of-band emissions.

At operation 1808, segments of $X_i[k]$ that correspond to different subcarrier bands of the FB-MC-SS waveform are normalized according to the equation (11). The result is called $\tilde{X}_i[k]$.

At operation 1810, matched filtering is applied to the normalized frequency domain samples $\tilde{X}_i[k]$ to obtain $\tilde{Y}_i[k]=\tilde{X}_i[k]G^*[k]$.

At operation 1812, the frequency domain matched filtered sequence $\tilde{Y}_i[k]$ is converted to the time domain through an IFFT operation and the result is overlapped and added to the previous partition of the output (in the time domain).

At operation 1814, the partition index i is incremented by one and operations 1804 through 1812 may be repeated. These operations may be repeated as long as necessary to obtain the output samples of the normalized matched filter that may be used in any packet detection and timing acquisition algorithm for finding the beginning of an FB-MC-SS data packet and obtaining the correct timing phase.

Figure 19A:
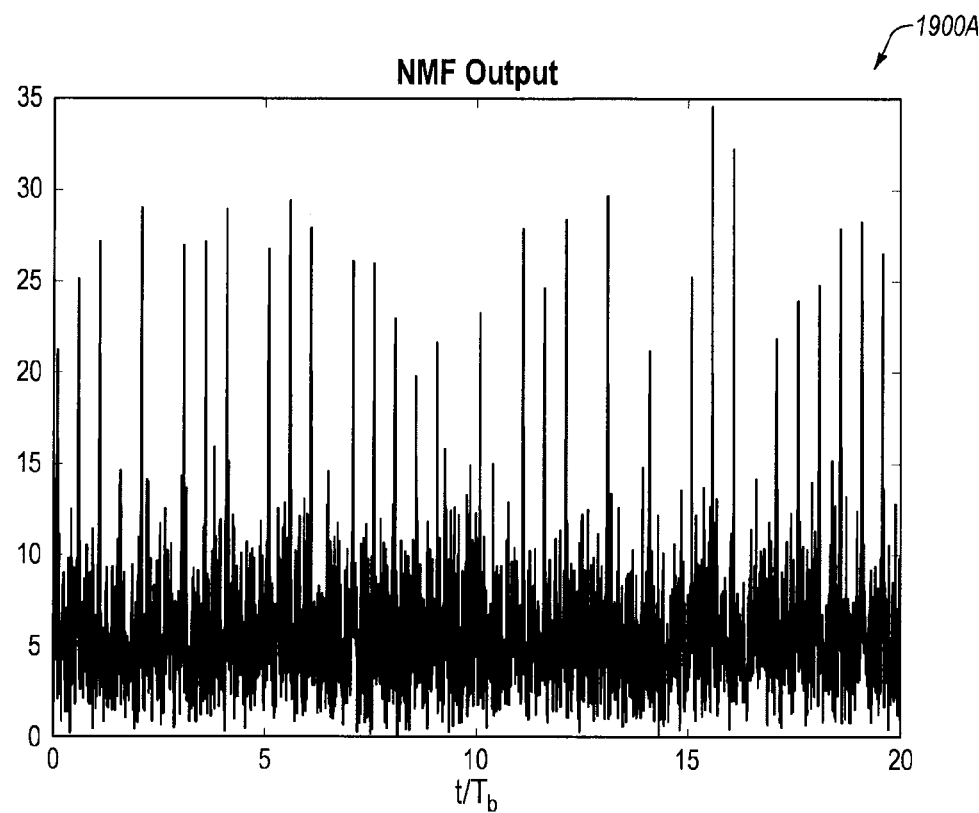
FIGS. 19A and 19B are plots demonstrating the interference rejection capability of the normalized matched filter.
Figure 19B:
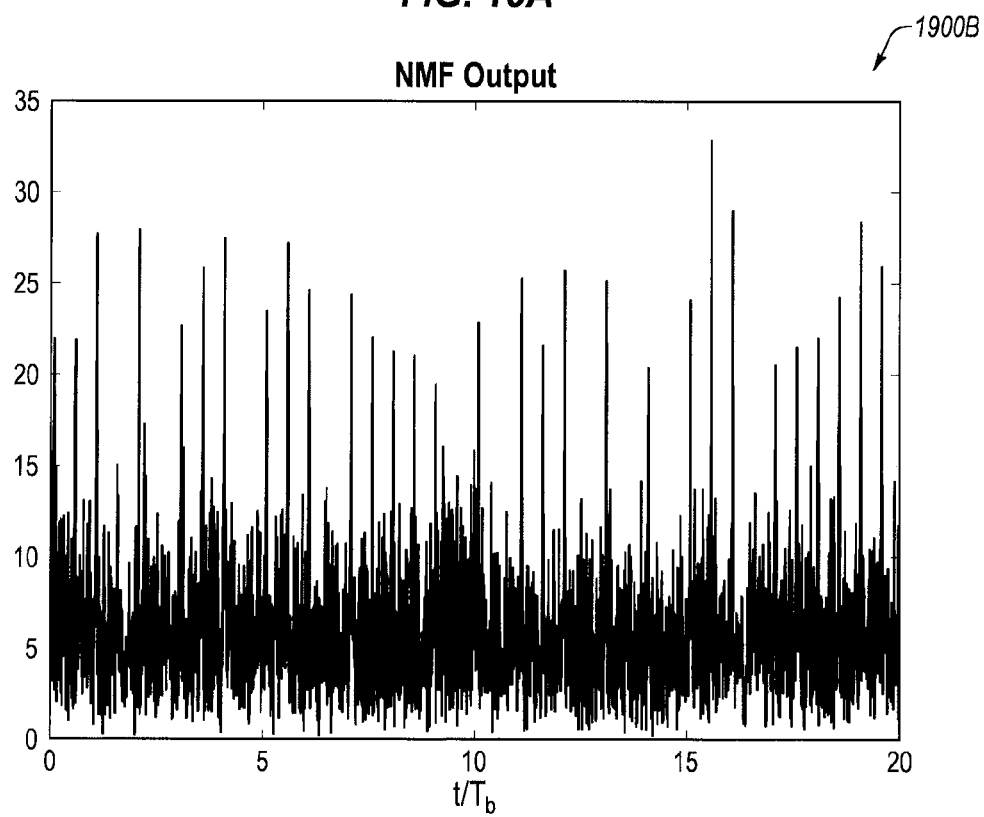

FIGS. 19A and 19B are plots 1900A, 1900B demonstrating the interference rejection capability of the normalized matched filter. In particular, the results in each plot 1900A, 1900B are presented for the scenario a raised-cosine window with 5% roll-offs at both sides is applied to the partitions of the incoming signal. The added raised-cosine roll-offs improves the interference suppression capability of the normalized matched filter, as apparent by the comparison below.

FIG. 19A shows the magnitude of the normalized matched filter output when the channel has corrupted the received signal with an AWGN at SNR level of 0 dB and partial band interference at 50 dB above the signal level. FIG. 19A is a comparable result to that of FIG. 10C, but with the roll-offs applied to the partitions of the incoming signal in FIG. 19A but not in FIG. 10C. As observed in FIG. 10C (without the addition of the roll-offs to the window), the normalized matched filter is not as effective in rejecting an interference that is 50 dB above the signal level in comparison to that of FIG. 19A. In contrast, the results in FIG. 19A show that with the added roll-offs to the window, the normalized matched filter is more effective in rejecting the interference. As a result, the synchronization pulses are more apparent at the output shown in FIG. 19A compared with FIG. 10C.

FIG. 19B shows the magnitude of the normalized matched filter output when the channel has corrupted the received signal with an AWGN at SNR level of 0 dB and partial band interference at 80 dB above the signal level. Analog amplifiers with linear performance over a dynamic range of 80 dB are not easy to implement according to conventional methods. Also, analog to digital convertor circuitries with typical 11 or 12 effective bits can cover a linear dynamic range of 60 to 70 dB, only. The normalized matched filter, is therefore, an improvement over conventional systems.

Figure 20:
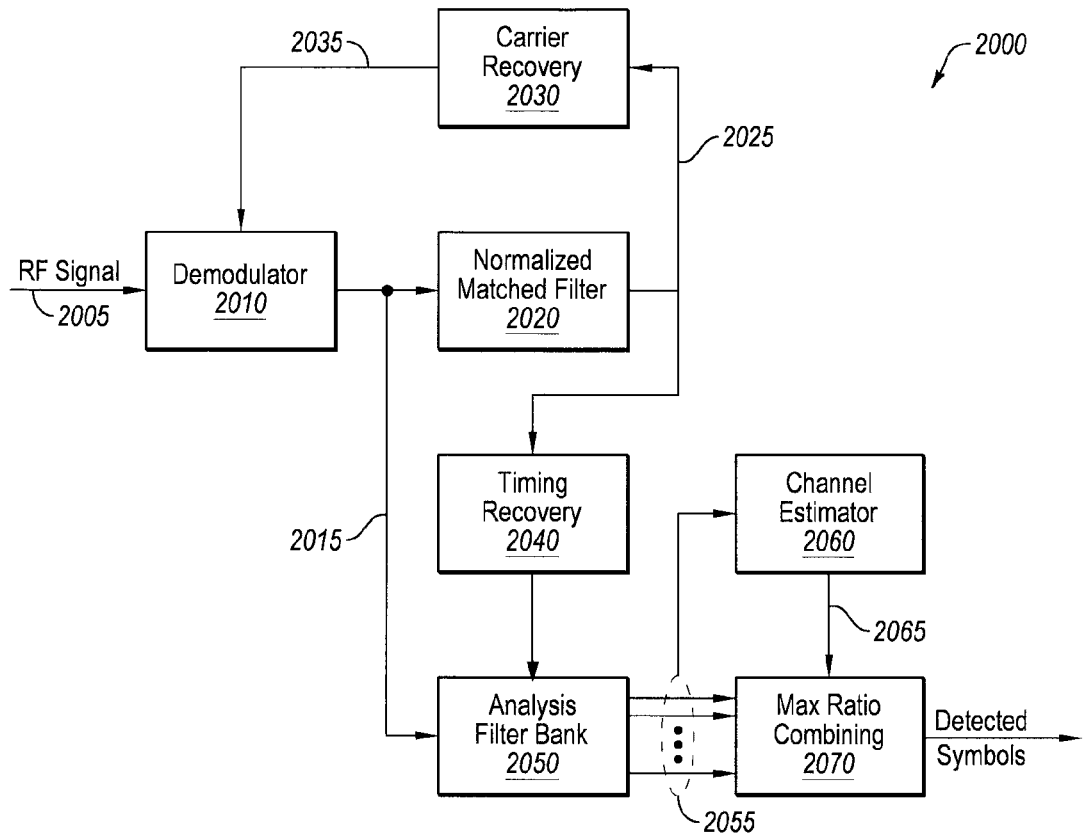
FIG. 20 is a simplified block diagram of a receiver according to an embodiment of the disclosure.

FIG. 20 is a simplified block diagram of a receiver 2000 according to an embodiment of the disclosure. The receiver 2000 is configured to detect and decode in incoming RF signal 2005 (e.g., an FB-MC-SS signal). The receiver 2000 includes a demodulator 2010, normalized matched filter 2020, carrier recovery unit 2030, timing recovery unit 2040, analysis filter bank 2050, channel estimator 2060, and maximum-ratio combining unit 2070. The demodulator 2010 receives the RF signal 2005, and converts the RF signal 2005 to a baseband input 2015. The baseband input 2015 is passed to the analysis filter bank 2050 and the normalized matched filter 2020.

The normalized matched filter 2020 is configured to have filter characteristics matched to those of the synthesis filter bank in the transmitter and generates a normalized output as discussed above. With the special selection of the parameters discussed above relative to the transmitter, the output from the normalized matched filter 2020 may be the sequence of high amplitude (i.e., narrow) pulses that can be clearly identified even when the FB-MC-SS signal is at a level below the noise level. The combination of the transmit and receive processes may result in a significant and unexpected improvement (both computationally faster and more precise) in timing recovery and frequency lock-in.

A sequence of narrow pulses 2025 from the normalized matched filter 2020 may occur at regular intervals and carry the necessary information for timing and carrier acquisition as well as for their tracking. In general, any carrier and timing recovery method takes advantage of the properties of the modulation method that has been used to construct the transmitted signal. Due to the implementation inaccuracies and channel conditions (e.g., accuracy of components and Doppler shift in the channel), the carrier frequency used at the transmitter and its counterpart frequency at the receiver 2000 are bound to suffer mismatch.

The carrier recovery unit 2030 finds such mismatches and compensates for the mismatches at the receiver 2000. To accomplish this carrier recovery, the normalized matched filter 2020 may be used to develop relatively efficient carrier and timing recovery algorithms. The output of the normalized matched filter 2020 includes the sequence of narrow pulses 2025 at the ½ spacing of the symbol timing (T/2). These narrow pulses 2025 are present at the time instants that are even multiples of T/2 and correspond to about the center of the data symbols.

On the other hand, at the time instants that are odd multiples of T/2, the presence of such pulses depends on the information bits transmitted before and after the time instant. In other words, the pulse at the odd multiples of T/2 will appear when two consecutive symbols have the same value, otherwise the pulse would be a null. This property of the normalized matched filter 2020 enables development of a timing recovery algorithm with a relatively low complexity/processing power. Once the pulses at the even multiples of T/2 are recognized, any carrier offset in the demodulated signal can be identified by comparing the relative phases of the pulses at the successive time instants, leading to carrier frequency recovery.

The carrier recovery unit 2030 may receive the sequence of narrow pulses 2025 and generate control signals 2035 to develop a phase-locked loop (PLL) between the demodulator 2010, the normalized matched filter 2020, and the carrier recovery unit 2030 as is known by those skilled in the art. As the PLL locks on, the phase of the baseband input 2015 is known relative to the sequence of narrow pulses 2025 from the normalized matched filter 2020. As a result, the timing recovery unit 2040 may use the sequence of narrow pulses 2025 as a synchronization signal to ensure that the demodulated and combined signals from all subcarriers (i.e., the baseband input 2015) can be sampled at correct times by the analysis filter bank 2050.

The sequence of narrow pulses 2025 containing the timing information and the baseband input 2015 from the demodulator 2010 are passed to the analysis filter bank 2050. The analysis filter bank 2050 extracts the received signal of each of the various subcarriers in parallel and samples them at a proper timing phase based on the timing information. The analysis filter bank 2050 performs the inverse process of the synthesis filter bank of the transmitter. Thus, the output of the analysis filter bank 2050 is a set of signals 2055 corresponding to each of the subcarrier frequencies in the FB-MC-SS signal. Due to the very low power level of the received signal, some of these signals in the set of signals 2055 may not carry accurate information. However, many of the signals in the set of signals 2055 will carry the same information that was transmitted.

The channel estimator 2060 examines the set of signals 2055 corresponding to each of the subcarrier frequencies to estimate a channel gain and a power of noise plus interference at each of the subcarrier bands by computing the impulse response of each channel in both time and frequency domain. Digital Signal Processing (DSP) and Field-Programmable Gate Arrays (FPGAs) may allow for one example of an inexpensive implementation for many of the functions in the receiver 2000 and the channel estimator 2060 in particular.

The maximum-ratio combining unit 2070 receives the set of signals 2055 from the analysis filter bank 2050 and information 2065 at the output of the channel estimator 2060 to obtain an estimate of the transmitted data symbols. The maximum-ratio combining unit 2070 calculates a weighted average of the detected data symbols at the output of the analysis filter bank 2050. The less noisy outputs are given higher weights and the more noisy outputs are given lower weights. To perform the combining, the maximum-ratio combining unit 2070 may divide a power estimate of each channel by the mean square of the estimated noise/interference, which may result in either a diminished noise where the signal is stronger or elimination of the certain subcarriers where the noise/interference is higher than the mean noise.

Figure 21:
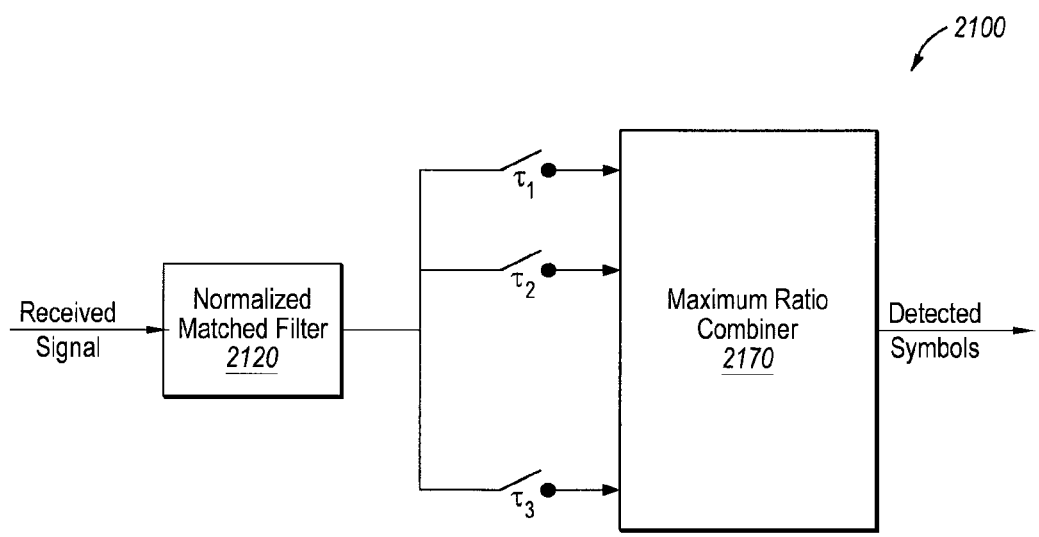
FIG. 21 is a simplified block diagram of a RAKE receiver according to an embodiment of the disclosure.

FIG. 21 is a simplified block diagram of a RAKE receiver 2100 according to an embodiment of the disclosure. RAKE receivers are commonly used in direct sequence spread spectrum (DS-SS) systems to reduce the effects of the signal fading due to multipath. In the case of FB-MC-SS systems, the common implementation makes use of an analysis filter bank (e.g., analysis filter bank 2010 in FIG. 20) to separate portions of the received signal that belong to different subcarrier frequency bands. The maximum ratio combining is then applied to the signal samples at the outputs of the analysis filter bank. By doing so, the subcarrier bands that are corrupted by interference are given lower gains and in this way a receiver with a near optimum performance is constructed. Such FB-MC-SS systems are known to have advantage over DS-SS in rejecting partial band interference.

The RAKE receiver 2100 includes a normalized matched filter 2120 configured as described above with respect to FIG. 18. The normalized matched filter 2120 may also be configured to remove partial band interference without resorting to the use of an analysis filter bank. As a result, the RAKE receiver 2100 may exhibit some performance loss when compared to the receiver 2000 of FIG. 20, but may have the benefit of having lower complexity.

The RAKE receiver 2100 makes use of the samples of the output of the normalized matched filter 2120 that correspond to different multi-paths of the channel. These multi-paths are combined together using a maximum ratio combiner. The maximum ratio combiner 2170 gives higher gains to the stronger paths and lower gains to weaker paths. In this way, an optimum receiver that maximizes the SNR at its output (detected symbols) is constructed.

Thus, embodiments of the disclosure improve over conventional partial band interference suppression techniques known to the inventors that rely on the use of notch/bandstop filters which require the knowledge or estimation of the position of interference within the transmission band of the spread spectrum signal. Embodiments of the disclosure may be configured to suppress the interference without knowing the position of interference by applying a non-linear process to the analyzed signal in the frequency domain.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure. Further, embodiments of the disclosure have utility with different and various detector types and configurations.

What is claimed is:

1. A method of operating a communication device, the method comprising:
   receiving, at a receiver, an incoming RF signal;
   demodulating, with a demodulator of the receiver, the incoming RF signal to generate a baseband signal;
   filtering the baseband signal with a normalized matched filter having filter characteristics matched to a pulse-shaping filter of a transmitter that generated the incoming RF signal, the filtering comprising:
      partitioning the baseband signal to obtain a number of sampled segments;
      performing an FFT on a sequence including a sampled segment of the number of sampled segments;
      normalizing the sequence in the frequency domain;
      applying a matched filtering operation to the normalized sequence to generate a matched filtered sequence;
      performing an inverse FFT on the matched filtered sequence to generate a result and
      performing an overlap-add operation with the result in the time domain to generate a normalized output; and
   extracting a received signal from the normalized output generated by the normalized matched filter.

2. The method of claim 1, wherein the incoming RF signal is a Filter-Bank Multi-Carrier Spread-Spectrum (FB-MC-SS) signal including at least one data symbol redundantly modulated onto each subcarrier of the FB-MC-SS signal such that each subcarrier includes the at least one data symbol.

3. The method of claim 2, wherein the pulse-shaping filter of the transmitter includes a synthesis filter bank.

4. The method of claim 3, wherein extracting the received signal further comprises extracting, with an analysis filter bank of the receiver, the received signal from each subcarrier of the normalized output by performing an inverse process of the synthesis filter bank of the transmitter.

5. The method of claim 2, wherein the FB-MC-SS signal is an underlay control channel signal.

6. The method of claim 2, wherein the FB-MC-SS signal has a power level below an apparent noise level for other signals of a frequency spectrum.

7. The method of claim 1, wherein normalizing the sampled segments includes $$\tilde{X}_i[k] = \frac{X_i[k]}{\sqrt{\sum_{k=k_1}^{k_2} |X_i[k]|^2}}, \text{ for } k_1 \le k \le k_2,$$

wherein $X_i[k]$ is an FFT result of the sampled segments.

8. The method of claim 1, wherein partitioning, performing, and normalizing is repeated for each subcarrier band.

9. The method of claim 1, further comprising applying a prototype filter p[n] on the sampled segments in the frequency domain.

10. The method of claim 9, wherein the prototype filter p[n] includes a rectangular pulse.

11. The method of claim 10, further comprising applying smoothing roll-off factors to a beginning and an end of the rectangular pulse of the prototype filter p[n].

12. A spread-spectrum receiver for detecting and decoding a signal, the spread-spectrum receiver comprising:
  a demodulator configured to generate a baseband signal responsive to demodulating an incoming RF signal;
  a normalized matched filter configured to filter the baseband signal with the normalized matched filter having filter characteristics matched to a pulse-shaping filter of a transmitter that generated the incoming RF signal, the normalized matched filter further configured to perform an overlap-add filtering method with normalized samples in the time domain; and
  a signal extractor configured to extract a received signal from a normalized output generated by the normalized matched filter.

13. The spread-spectrum receiver of claim 12, wherein the incoming RF signal includes a Filter-Bank Multi-Carrier Spread-Spectrum (FB-MC-SS) signal having a power level below an apparent noise level for other signals of a frequency spectrum, wherein the FB-MC-SS includes at least one data symbol redundantly modulated onto each subcarrier of the FB-MC-SS signal such that each subcarrier includes the at least one data symbol.

14. The spread-spectrum receiver of claim 13, wherein the signal extractor includes an analysis filter bank configured to extract the received signal from each subcarrier of the baseband signal by performing an inverse process of a synthesis filter bank of the transmitter that generated the FB-MC-SS signal.

15. The spread-spectrum receiver of claim 14, further comprising a maximum-ratio combining unit configured to obtain an estimate of the transmitted data symbols for the received signal.

16. The spread-spectrum receiver of claim 12, wherein the normalized matched filter includes a prototype filter having a window with a smoothing roll-off factor applied to a beginning and an end of the window.

17. A communication device, comprising:
  a spread-spectrum receiver configured to suppress interference in individual subcarrier bands of a demodulated Filter-Bank Multi-Carrier Spread-Spectrum (FB-MC-SS) signal responsive to normalizing samples of the demodulated FB-MC-SS signal in the frequency domain to a power of unity, the spread-spectrum receiver further configured to perform an overlap-add filtering method with normalized samples in the time domain.

18. The communication device of claim 17, wherein the receiver is a RAKE receiver.

19. The communication device of claim 17, wherein spread-spectrum receiver includes a normalized matched filter configured to perform the overlap-add filtering method.

20. The communication device of claim 19, wherein the normalized matched filter includes a prototype filter having a window with a smoothing roll-off factor applied to a beginning and an end of the window.

* * * * *